United States Patent
Yong et al.

(10) Patent No.: US 12,036,471 B2
(45) Date of Patent: *Jul. 16, 2024

(54) OVERLAPPING SCAN-IN AND ENCODE AT THE SERVER

(71) Applicant: Sony Interactive Entertainment Inc., Tokyo (JP)

(72) Inventors: Kelvin M. Yong, Irvine, CA (US); Mark E. Cerny, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 17/893,707

(22) Filed: Aug. 23, 2022

(65) Prior Publication Data
US 2022/0401835 A1 Dec. 22, 2022

Related U.S. Application Data

(63) Continuation of application No. 17/001,547, filed on Aug. 24, 2020, now Pat. No. 11,420,118.

(60) Provisional application No. 62/909,156, filed on Oct. 1, 2019, provisional application No. 62/909,157, filed on Oct. 1, 2019.

(51) Int. Cl.
| | |
|---|---|
| *A63F 13/355* | (2014.01) |
| *A63F 13/50* | (2014.01) |
| *H04N 21/236* | (2011.01) |
| *H04N 21/4385* | (2011.01) |

(52) U.S. Cl.
CPC ............ *A63F 13/355* (2014.09); *A63F 13/50* (2014.09); *H04N 21/23605* (2013.01); *H04N 21/4385* (2013.01); *A63F 2300/538* (2013.01)

(58) Field of Classification Search
CPC . A63F 13/355; A63F 13/50; H04N 21/23605; H04N 21/4385; A64F 2300/538
See application file for complete search history.

(56) References Cited

U.S. PATENT DOCUMENTS

| | | | | |
|---|---|---|---|---|
| 10,511,877 | B2 * | 12/2019 | Maltagliati | H04N 21/435 |
| 2013/0132510 | A1 * | 5/2013 | Ye | H04N 21/2343 709/217 |
| 2017/0064320 | A1 * | 3/2017 | Sadhwani | G06T 1/20 |
| 2021/0093958 | A1 * | 4/2021 | Yong | A63F 13/358 |
| 2021/0093960 | A1 * | 4/2021 | Cerny | A63F 13/53 |
| 2021/0093963 | A1 * | 4/2021 | Colenbrander | A63F 13/358 |
| 2021/0093966 | A1 * | 4/2021 | Cerny | H04N 21/8547 |
| 2021/0099713 | A1 * | 4/2021 | Cerny | H04N 19/107 |

\* cited by examiner

*Primary Examiner* — William H McCulloch, Jr.
*Assistant Examiner* — Ankit B Doshi
(74) *Attorney, Agent, or Firm* — PENILLA IP, APC

(57) ABSTRACT

A method for cloud gaming. The method including generating a video frame when executing a video game at a server. The method including scanning-in the video frame to an encoder at the server scanline-by-scanline. The method including encoding one or more encoder slices as one or more encoded slices at the encoder, wherein each encoded slice is delivered to a buffer at an encoder fill rate. The method including draining a first encoded slice from the buffer to stream the first encoded slice at a buffer drain rate over a network to a client, wherein the first encoded slice is streamed over the network before fully encoding the one or more slices of the video frame.

20 Claims, 14 Drawing Sheets

OVERLAPPING SCAN-IN AND ENCODE AT THE SERVER

CLAIM OF PRIORITY

This application is a continuation of claims priority to and the benefit of U.S. application Ser. No. 17/001,547, filed on Aug. 24, 2020, entitled "Overlapping Encode And Transmit At The Server"; which claims priority to and the benefit of U.S. Provisional App. Ser. No. 62/909,156 filed on Oct. 1, 2019, entitled "Overlapping Encode And Transmit At The Server," the disclosures of which are incorporated herein by reference in their entireties for all purposes. This application is a continuation of claims priority to and the benefit of U.S. application Ser. No. 17/001,547, filed on Aug. 24, 2020, entitled "Overlapping Encode And Transmit At The Server"; which claims priority to and the benefit of U.S. Provisional App. Ser. No. 62/909,157 filed on Oct. 1, 2019, entitled "Reducing Latency In Cloud Gaming Applications By Overlapping Receive And Decode Of Video Frames And Their Display At The Client," the disclosures of which are incorporated herein by reference in their entireties for all purposes.

TECHNICAL FIELD

The present disclosure is related to streaming systems configured for streaming content across a network, and more specifically to overlapping operations at a cloud gaming server and/or a client for reducing latency between the cloud gaming server and the client.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to network between players for multi-player gaming, sharing of assets between players, sharing of instant experiences between players and/or spectators, allowing friends to watch a friend play a video game, having a friend join the on-going game play of a friend, and the like. Unfortunately, the demand is also pushing up against limits of the capabilities of network connections and the processing performed at the server and the client that is responsive enough to render high quality images as delivered to the client. For example, results of all gaming activities that are performed on the server need to be compressed and transmitted back to the client at low millisecond latency for the best user experience. Round-trip latency may be defined as the overall time between the user's controller input and the display of the video frames at the client; it may include processing and transmission of the control information from controller to client, processing and transmission of the control information from client to server, usage of that input at the server to generate a video frame responsive to the input, processing and transfer of the video frame to the encoding unit (e.g. scan-out), encode of the video frame, transmission of the encoded video frame back to the client, reception and decoding of the video frame, and any processing or staging of the video frame prior to its display. One-way latency may be defined as being the part of the round-trip latency consisting of the time from beginning of transfer of the video frame to the encoding unit (e.g. scan-out) at the server to the beginning of display of video frame at the client. A portion of the round-trip and one-way latency is associated with time taken for the data streams to be sent from client to server and server to client over a communications network. Another portion is associated with processing at client and server; improvements in these operations, such as advanced strategies related to frame decoding and display, can result in substantially reduced round-trip and one-way latency between the server and the client and provide a higher quality experience to users of cloud gaming services.

It is in this context that embodiments of the disclosure arise.

SUMMARY

Embodiments of the present disclosure relate to streaming systems configured for streaming content (e.g., gaming) across a network, and more specifically to overlapping encode and send operations at the server, and overlapping receive and decode operations at the client, and overlapping receive, decode, and rendering to a display operations at the client.

Embodiments of the present disclosure disclose a method for cloud gaming. The method includes receiving one or more encoded slices of a video frame at a client, wherein the video frame was generated at a server while executing a video game, and encoded by an encoder at the server into the one or more encoded slices. The method includes decoding a first encoded slice at a decoder of the client before fully receiving the one or more encoded slices of the video frame. At the server, a plurality of video frames is generated responsive to processing of a video game by the server in a streaming mode during a session with the client. The plurality of video frames is encoded at the encoder into a plurality of compressed video frames, each corresponding compressed video frame including one or more corresponding encoded slices. The plurality of compressed video frames is transmitted to the client over a network.

In another embodiment, a method for cloud gaming is disclosed. The method including generating a video frame when executing a video game at a server. The method including scanning-in the video frame to an encoder at the server scanline-by-scanline. The method including encoding one or more scanlines as one or more encoded slices at the encoder, wherein each encoded slice is delivered to a buffer at an encoder fill rate. The method including draining a first encoded slice from the buffer to stream the first encoded slice at a buffer drain rate over a network to a client, wherein the first encoded slice is streamed over the network before fully encoding the one or more slices of the video frame.

In another embodiment, a non-transitory computer-readable medium storing a computer program for cloud gaming is disclosed. The computer-readable medium including program instructions for receiving one or more encoded slices of a video frame at a client, wherein the video frame was generated at a server while executing a video game, and encoded by an encoder at the server into the one or more encoded slices. The computer-readable medium including program instructions for decoding a first encoded slice at a decoder of the client before fully receiving the one or more encoded slices of the video frame. At the server, a plurality of video frames is generated responsive to processing of a video game by the server in a streaming mode during a session with the client. The plurality of video frames is encoded at the encoder into a plurality of compressed video frames, each corresponding compressed video frame including one or more corresponding encoded slices. The plurality of compressed video frames is transmitted to the client over a network.

In another embodiment, a non-transitory computer-readable medium storing a computer program for cloud gaming. The non-transitory computer-readable medium including program instructions for generating a video frame when executing a video game at a server. The non-transitory computer-readable medium including program instructions for scanning-in the video frame to an encoder at the server scanline-by-scanline. The non-transitory computer-readable medium including program instructions for encoding one or more encoder slices as one or more encoded slices at the encoder, wherein each encoded slice is delivered to a buffer at an encoder fill rate. The non-transitory computer-readable medium including program instructions for draining a first encoded slice from the buffer to stream the first encoded slice at a buffer drain rate over a network to a client, wherein the first encoded slice is streamed over the network before fully encoding the one or more slices of the video frame.

In still another embodiment, a computer system includes a processor, and memory coupled to the processor and having stored therein instructions that, if executed by the computer system, cause the computer system to execute a method for cloud gaming. The method includes receiving one or more encoded slices of a video frame at a client, wherein the video frame was generated at a server while executing a video game, and encoded by an encoder at the server into the one or more encoded slices. The method includes decoding a first encoded slice at a decoder of the client before fully receiving the one or more encoded slices of the video frame. At the server, a plurality of video frames is generated responsive to processing of a video game by the server in a streaming mode during a session with the client. The plurality of video frames is encoded at the encoder into a plurality of compressed video frames, each corresponding compressed video frame including one or more corresponding encoded slices. The plurality of compressed video frames is transmitted to the client over a network.

In still another embodiment, a computer system includes a processor, and memory coupled to the processor and having stored therein instructions that, if executed by the computer system, cause the computer system to execute a method for cloud gaming. The method including generating a video frame when executing a video game at a server. The method including scanning-in the video frame to an encoder at the server scanline-by-scanline. The method including encoding one or more encoder slices as one or more encoded slices at the encoder, wherein each encoded slice is delivered to a buffer at an encoder fill rate. The method including draining a first encoded slice from the buffer to stream the first encoded slice at a buffer drain rate over a network to a client, wherein the first encoded slice is streamed over the network before fully encoding the one or more slices of the video frame.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
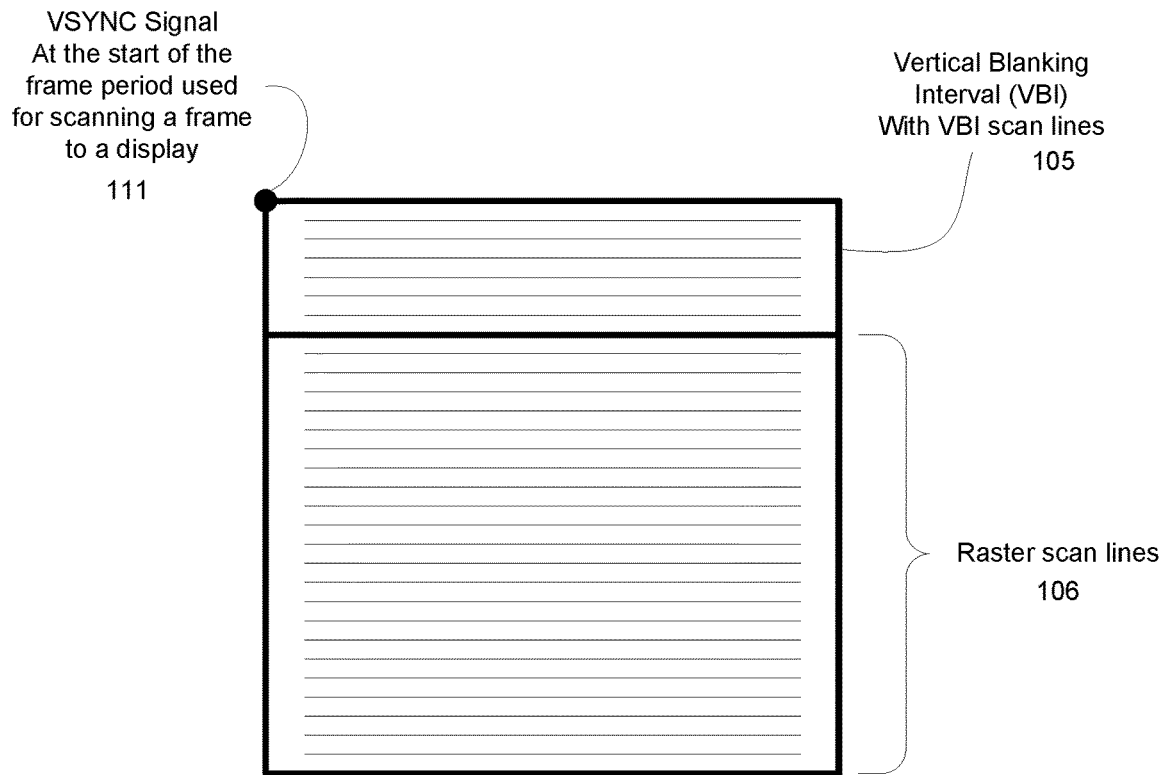
FIG. 1A is a diagram of a VSYNC signal at the beginning of a frame period, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems configured to reduce latency and/or latency instability between source and target devices when streaming media content (e.g., streaming audio and video from video games). In particular, in some embodiments of the present disclosure, one-way latency in cloud gaming applications may be reduced by overlapping encode and transmission operations of video frames at the server when streaming video frames generated from a video game executing on the server. The server in cloud gaming applications encodes video frames, and to reduce one-way latency transmission of data from the server to the client may begin as soon as a packet is encoded by an encoder of the server. This may require information (e.g., amount of data encoded at a given time) to be shared within the server between the encode unit and those units (e.g., streamer operating at the application layer) performing the transmission of data. In some embodiments, the encoder is tuned to encode packets such that the packet size corresponds to natural quantities of data being created by the encoder. In one example, a packet size may correspond to a network based maximum transmission unit (MTU). In another example, the packet size may correspond to a MTU and also be limited to an encoded slice generated by the encoder. In still another example, a packet size may correspond to a scanline or screen slice, in one embodiment. In that manner, one-way latency and the amount of buffering required are reduced. In addition, in some embodiments of the present disclosure, one-way latency in cloud gaming applications may be reduced by overlapping reception and decoding operations of video frames at the client when streaming video frames generated from a video game executing on the server. In other embodiments of the present disclosure, one-way latency between a cloud gaming server and a client may be reduced by overlapping reception and decode operations of compressed video frames and their display. The client in cloud gaming applications receives compressed video frames from the cloud gaming server, and is configured to decode the compressed video frames. One-way latency between the server and the client may be reduced by beginning the decode operations at the client as soon as possible. For example, each packet of an encoded slice may be decoded as it is received by the client from the server. Also, one-way latency can be reduced by beginning display of a video frame before the frame has been completely received or decoded at the client. Timing of submission for display must anticipate remaining time needed for reception and decode of the compressed video frames. As previously introduced, packet sizing may correspond to natural quantities of data being created by the encoder (e.g., MTU, scanline, encoder slice sized to the MTU, etc.), which makes it possible to decode each packet as it arrives.

In particular, latency instability may be introduced between a server and client due to the additional time needed to generate a complex frame (e.g., scene change) at the server, increased times to encode/compress the complex frame at the server, variable communication paths over a network, and increased time to decode complex frames at the client. Latency instability may also be introduced due to differences in clocks at the server and the client, which causes a drift between server and client VSYNC signals. In one embodiment, this latency instability may be removed by overlapping encode and transmission operations at the server, receive and decode operations at the client, and/or receive and decode and rendering for display operations at the client.

With the above general understanding of the various embodiments, example details of the embodiments will now be described with reference to the various drawings.

Throughout the specification, the reference to "game" or video game" or "gaming application" or "application" is meant to represent any type of interactive application that is directed through execution of input commands. For illustration purposes only, an interactive application includes applications for gaming, word processing, video processing, video game processing, etc. Further, the terms introduced above are interchangeable.

Cloud gaming includes the execution of a video game at the server to generate game rendered video frames, which are then sent to a client for display. Timing of operations at both the server and the client may be tied to respective vertical synchronization (VSYNC) parameters. When VSYNC signals are properly synchronized and/or offset between the server and/or the client, the operations performed at the server (e.g., generation and transmission of video frames over one or more frame periods) are synchronized with the operations performed at the client (e.g., displaying the video frames on a display at a display frame or refresh rate corresponding to the frame period). In particular, a server VSYNC signal generated at the server and a client VSYNC signal generated at the client may be used for synchronizing operations at the server and client. That is, when server and client VSYNC signals are synchronized and/or offset, the server generates and sends video frames in synchronization with how the client displays those video frames.

VSYNC signaling and vertical blanking intervals (VBI) have been incorporated for generating video frames and displaying those video frames when streaming media content between a server and a client. For example, the server strives to generate a game rendered video frame in one or several frame periods as defined by a corresponding server VSYNC signal (e.g. if a frame period of 16.7 ms, then generating a video frame each frame period results in 60 Hz operation, and generating one video frame for each two frame periods results in 30 Hz operation), and subsequently encode and transmit that video frame to the client. At the client, the received encoded video frames are decoded and displayed, wherein the client displays each video frame that is rendered for display beginning with a corresponding client VSYNC.

Figure 1B:
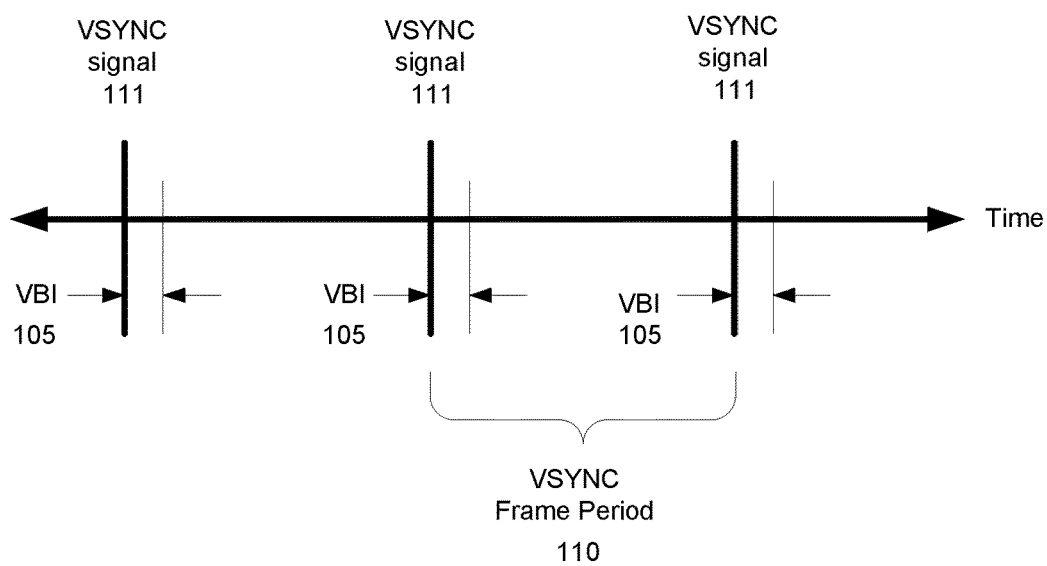
FIG. 1B is a diagram of the frequency of a VSYNC signal, in accordance with one embodiment of the present disclosure.

For illustration, FIG. 1A shows how a VSYNC signal 111 may indicate the beginning of a frame period, wherein various operations may be performed during a corresponding frame period at the server and/or client. When streaming media content, the server may use a server VSYNC signal for generating and encoding video frames, and the client may use a client VSYNC signal for displaying the video frames. The VSYNC signal 111 is generated at a defined frequency which corresponds to the defined frame period 110, as shown in FIG. 1B. In addition, VBI 105 defines the time period between when the last raster line was drawn on the display for a previous frame period and when the first raster line (e.g., top) is drawn to the display. As shown, after VBI 105, the video frame rendered for display is displayed via raster scanlines 106 (e.g., raster line by raster line, from left to right).

In addition, various embodiments of the present disclosure are disclosed for reducing one-way latency and/or latency instability between source and target devices, such as when streaming media content (e.g., video game content). For purposes of illustration only, the various embodiments for reducing one-way latency and/or latency instability are described within a server and client network configuration. However, it is understood that the various techniques disclosed for reducing one-way latency and/or latency instability may be implemented within other network configurations, and/or over peer-to-peer networks, as is shown in FIGS. 2A-2D. For example, the various embodiments disclosed for reducing one-way latency and/or latency instability may be implemented between one or more of server and client devices in various configurations (e.g., server and client, server and server, server and multiple clients, server and multiple servers, client and client, client and multiple clients, etc.).

Figure 2A:
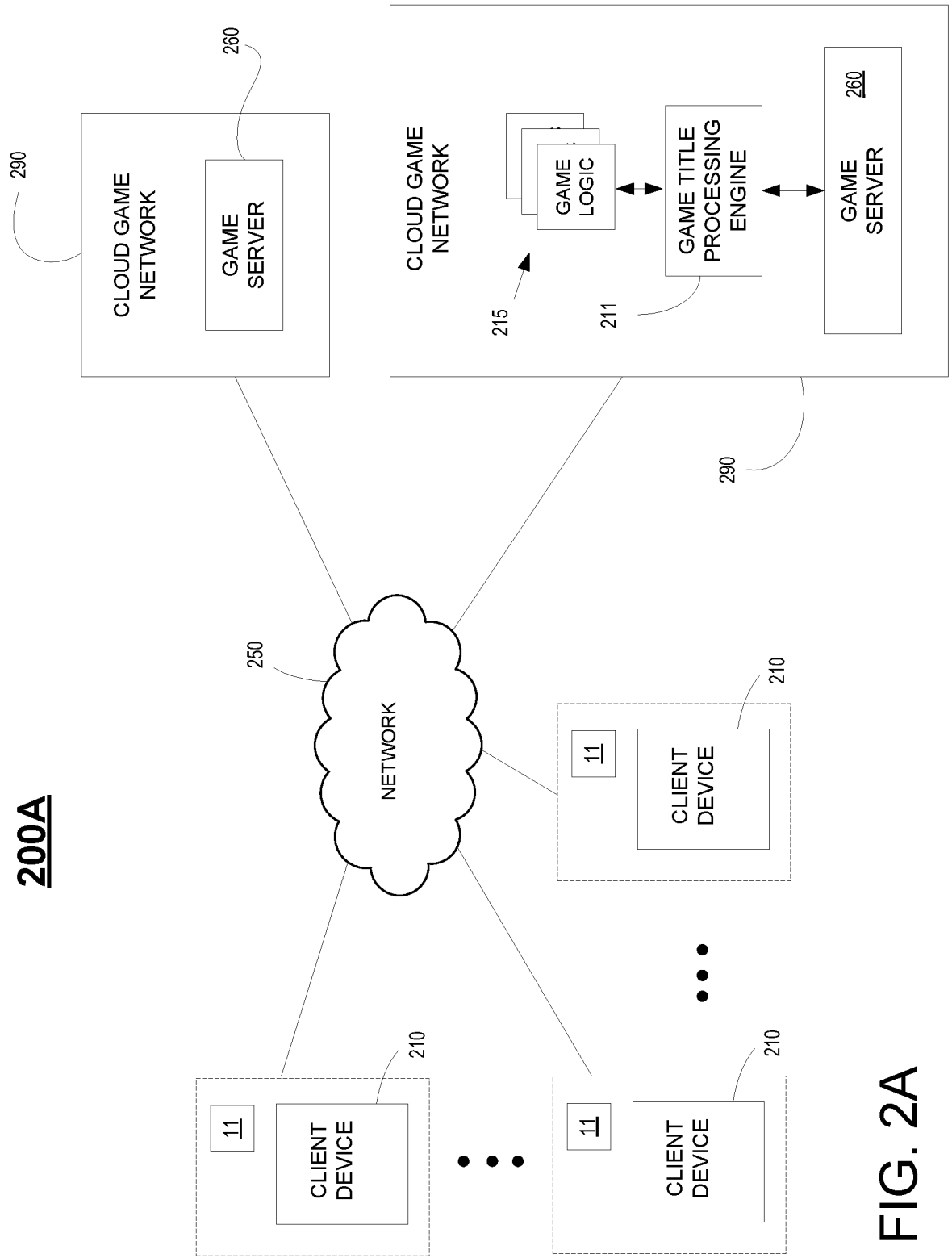
FIG. 2A is a diagram of a system for providing gaming over a network between one or more cloud gaming servers, and one or more client devices, in various configurations, wherein VSYNC signals can be synchronized and offset to reduce one-way latency, in accordance with one embodiment of the present disclosure.

FIG. 2A is a diagram of a system 200A for providing gaming over a network 250 between one or more cloud gaming networks 290 and/or servers 260, and one or more client devices 210, in various configurations, wherein server and client VSYNC signals can be synchronized and offset, and/or wherein dynamic buffering is performed on the client, and/or wherein encode and transmit operations on the server can be overlapped, and/or wherein receive and decode operations at the client can be overlapped, and/or wherein decode and display operations on the client can be overlapped to reduce one-way latency between the server 260 and client 210, in accordance with one embodiment of the present disclosure. In particular, system 200A provides gaming via a cloud game network 290, wherein the game is being executed remote from client device 210 (e.g., thin client) of a corresponding user that is playing the game, in accordance with one embodiment of the present disclosure. System 200A may provide gaming control to one or more users playing one or more games through the cloud game network 290 via network 250 in either single-player or multi-player modes. In some embodiments, the cloud game network 290 may include a plurality of virtual machines (VMs) running on a hypervisor of a host machine, with one or more virtual machines configured to execute a game processor module utilizing the hardware resources available to the hypervisor of the host. Network 250 may include one or more communication technologies. In some embodiments, network 250 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 290 includes a game server 260 that provides access to a plurality of video games. Game server 260 may be any type of server computing device available in the cloud, and may be configured as one or more virtual machines executing on one or more hosts. For example, game server 260 may manage a virtual machine supporting a game processor that instantiates an instance of a game for a user. As such, a plurality of game processors of game server 260 associated with a plurality of virtual machines is configured to execute multiple instances of one or more games associated with gameplays of a plurality of users. In that manner, back end server support provides streaming of media (e.g., video, audio, etc.) of gameplays of a plurality of gaming applications to a plurality of corresponding users. That is, game server 260 is configured to stream data (e.g., rendered images and/or frames of a corresponding gameplay) back to a corresponding client device 210 through network 250. In that manner, a computationally complex gaming application may be executing at the back end server in response to controller inputs received and forwarded by client device 210. Each server is able to render images and/or frames that are then encoded (e.g., compressed) and streamed to the corresponding client device for display.

For example, a plurality of users may access cloud game network 290 via communications network 250 using corresponding client devices 210 configured for receiving streaming media. In one embodiment, client device 210 may be configured as a thin client providing interfacing with a back end server (e.g., game server 260 of cloud game network 290) configured for providing computational functionality (e.g., including game title processing engine 211). In another embodiment, client device 210 may be configured with a game title processing engine and game logic for at least some local processing of a video game, and may be further utilized for receiving streaming content as generated by the video game executing at a back end server, or for other content provided by back end server support. For local processing, the game title processing engine includes basic processor based functions for executing a video game and services associated with the video game. The game logic is stored on the local client device 210 and is used for executing the video game.

In particular, client device 210 of a corresponding user (not shown) is configured for requesting access to games over a communications network 250, such as the internet, and for rendering for display images generated by a video game executed by the game server 260, wherein encoded images are delivered to the client device 210 for display in association with the corresponding user. For example, the user may be interacting through client device 210 with an instance of a video game executing on game processor of game server 260. More particularly, an instance of the video game is executed by the game title processing engine 211. Corresponding game logic (e.g., executable code) 215 implementing the video game is stored and accessible through a data store (not shown), and is used to execute the video game. Game title processing engine 211 is able to support a plurality of video games using a plurality of game logics, each of which is selectable by the user.

For example, client device 210 is configured to interact with the game title processing engine 211 in association with the gameplay of a corresponding user, such as through input commands that are used to drive gameplay. In particular, client device 210 may receive input from various types of input devices, such as game controllers, tablet computers, keyboards, gestures captured by video cameras, mice, touch pads, etc. Client device 210 can be any type of computing device having at least a memory and a processor module that is capable of connecting to the game server 260 over network 250. The back-end game title processing engine 211 is configured for generating rendered images, which is delivered over network 250 for display at a corresponding display in association with client device 210. For example, through cloud based services the game rendered images may be delivered by an instance of a corresponding game executing on game executing engine 211 of game server 260. That is, client device 210 is configured for receiving encoded images (e.g., encoded from game rendered images generated through execution of a video game), and for displaying the images that are rendered for display 11. In one embodiment, display 11 includes an HMD (e.g., displaying VR content). In some embodiments, the rendered images may be streamed to a smartphone or tablet, wirelessly or wired, direct from the cloud based services or via the client device 210 (e.g., PlayStation® Remote Play).

In one embodiment, game server 260 and/or the game title processing engine 211 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

In one embodiment, cloud game network 290 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 290, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

The game title processing engine 211 includes a central processing unit (CPU) and graphics processing unit (GPU) group that may be configured to perform multi-tenancy GPU functionality. In another embodiment, multiple GPU devices are combined to perform graphics processing for a single application that is executing on a corresponding CPU.

Figure 2B:
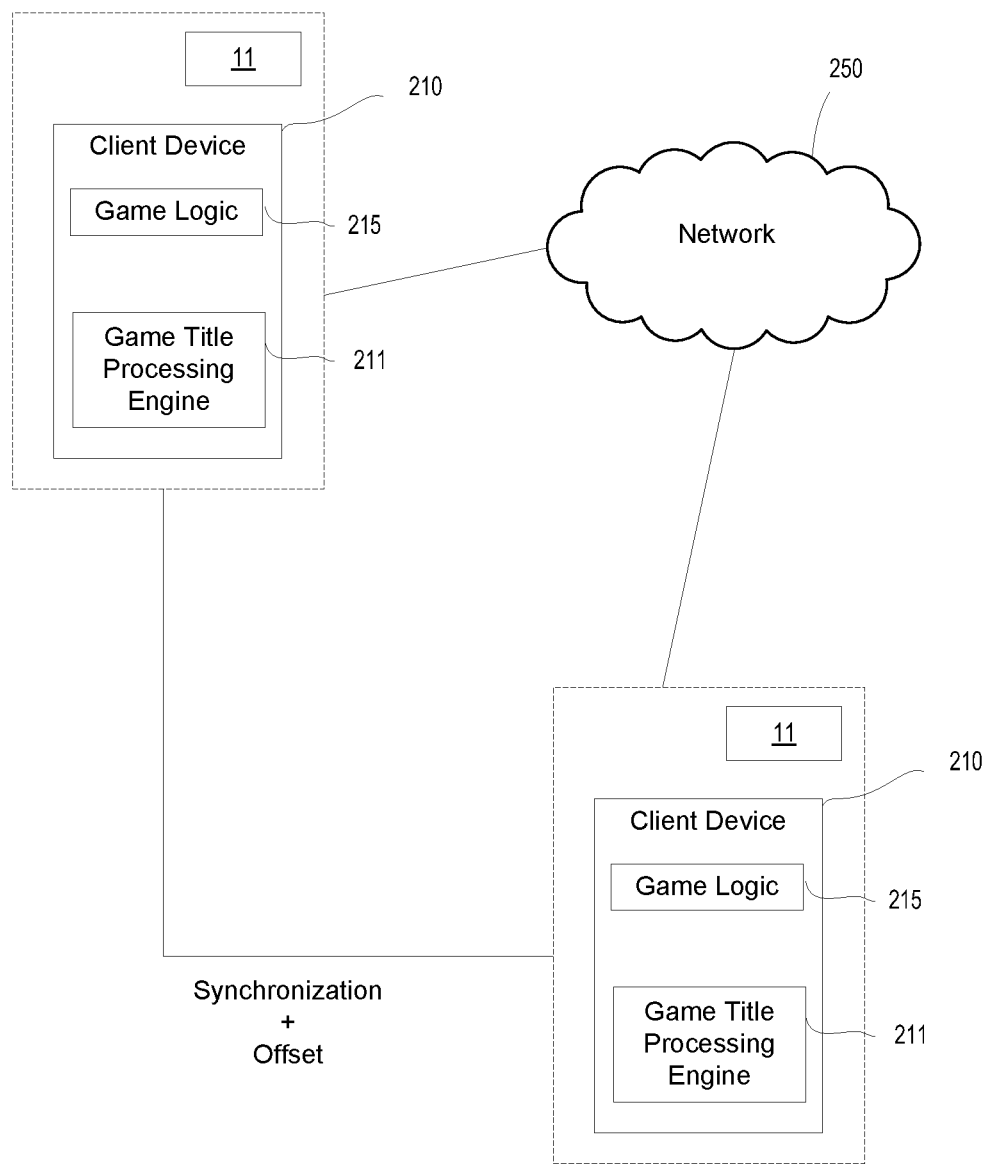
FIG. 2B is a diagram for providing gaming between two or more peer devices, wherein VSYNC signals can be synchronized and offset to achieve optimal timing of receipt of controller and other information between the devices, in accordance with one embodiment of the present disclosure.

FIG. 2B is a diagram for providing gaming between two or more peer devices, wherein VSYNC signals can be synchronized and offset to achieve optimal timing of receipt of controller and other information between the devices, in accordance with one embodiment of the present disclosure. For example, head-to-head gaming may be performed using two or more peer devices that are connected through network 250 or directly through peer-to-peer communication (e.g., Bluetooth, local area networking, etc.).

As shown, a game is being executed locally on each of the client devices 210 (e.g., game console) of corresponding users that are playing the video game, wherein the client devices 210 communicate through peer-to-peer networking. For example, an instance of a video game is executing by the game title processing engine 211 of a corresponding client device 210. Game logic 215 (e.g., executable code) implementing the video game is stored on the corresponding client device 210, and is used to execute the game. For purposes of illustration, game logic 215 may be delivered to the corresponding client device 210 through a portable medium (e.g. optical media) or through a network (e.g., downloaded through the internet from a gaming provider).

In one embodiment, the game title processing engine 211 of a corresponding client device 210 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

Client device 210 may receive input from various types of input devices, such as game controllers, tablet computers, keyboards, gestures captured by video cameras, mice, touch pads, etc. Client device 210 can be any type of computing device having at least a memory and a processor module, and is configured for generating rendered images executed by the game title processing engine 211, and for displaying the rendered images on a display (e.g., display 11, or display 11 including a head mounted display—HMD, etc.). For example, the rendered images may be associated with an instance of the game executing locally on client device 210 to implement gameplay of a corresponding user, such as through input commands that are used to drive gameplay. Some examples of client device 210 include a personal computer (PC), a game console, a home theater device, a general purpose computer, mobile computing device, a tablet, a phone, or any other types of computing devices that can execute an instance of a game.

Figure 2C:
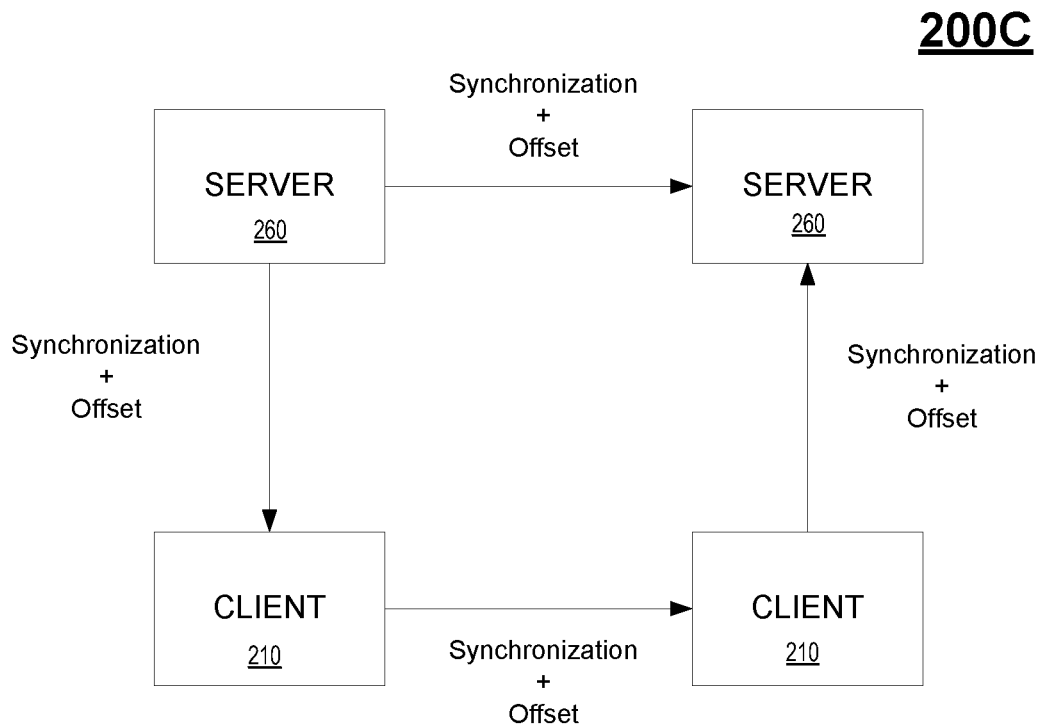
FIG. 2C illustrates various network configurations that benefit from proper synchronization and offsetting of VSYNC signals between a source device and a target device, in accordance with one embodiment of the present disclosure.

FIG. 2C illustrates various network configurations that benefit from proper synchronization and offsetting of VSYNC signals between a source device and a target device, including those configurations shown in FIGS. 2A-2B, in accordance with embodiments of the present disclosure. In particular, the various network configurations benefit from proper alignment of frequencies of server and client VSYNC signals, and a timing offset of the server and client VSYNC signals for purposes of reducing one-way latency and/or latency variability between a server and client. For example, one network device configuration includes a cloud gaming server (e.g., source) to client (target) configuration. In one embodiment, the client may include a WebRTC client configured for providing audio and video communication inside a web browser. Another network configuration includes a client (e.g. source) to server (target) configuration. Still another network configuration includes a server (e.g., source) to server (e.g., target) configuration. Another network device configuration includes a client (e.g., source) to client (target) configuration, wherein the clients can each be a gaming console to provide for head-to-head gaming, for example.

In particular, alignment of VSYNC signals may include synchronizing the frequencies of the server VSYNC signal and the client VSYNC signal, and may also include adjusting a timing offset between the client VSYNC signal and server VSYNC signal, for the purposes of removing drift, and/or to maintain an ideal relationship between server and client VSYNC signals, for purposes of reducing one-way latency and/or latency variability. To achieve proper alignment, the server VSYNC signal may be tuned in order to implement proper alignment between a server 260 and client 210 pair, in one embodiment. In another embodiment, the client VSYNC signal may be tuned in order to implement proper alignment between a server 260 and client 210 pair. Once the client and server VSYNC signals are aligned, the server VSYNC signal and client VSYNC signal occur at substantially the same frequency, and are offset from each other by a timing offset, that may be adjusted from time to time. In another embodiment, alignment of VSYNC signals may include synchronizing the frequencies of VSYNC for two clients, and may also include adjusting a timing offset between their VSYNC signals, for the purposes of removing drift, and/or achieving optimal timing of receipt of controller and other information; either VSYNC signal may be tuned to achieve this alignment. In still another embodiment, alignment may include synchronizing the frequencies of VSYNC for a plurality of servers, and may also include synchronizing the frequencies of the server VSYNC signals and the client VSYNC signals and adjusting a timing offset between the client VSYNC and server VSYNC signals, e.g. for head-to-head cloud gaming. In the server to client configuration and the client to client configuration, alignment may include both synchronization of the frequencies between the server VSYNC signal and client VSYNC signal, as well as providing a proper timing offset between the server VSYNC signal and client VSYNC signal. In the server to server configuration, alignment may include synchronization of the frequencies between the server VSYNC signal and client VSYNC signal without setting a timing offset.

Figure 2D:
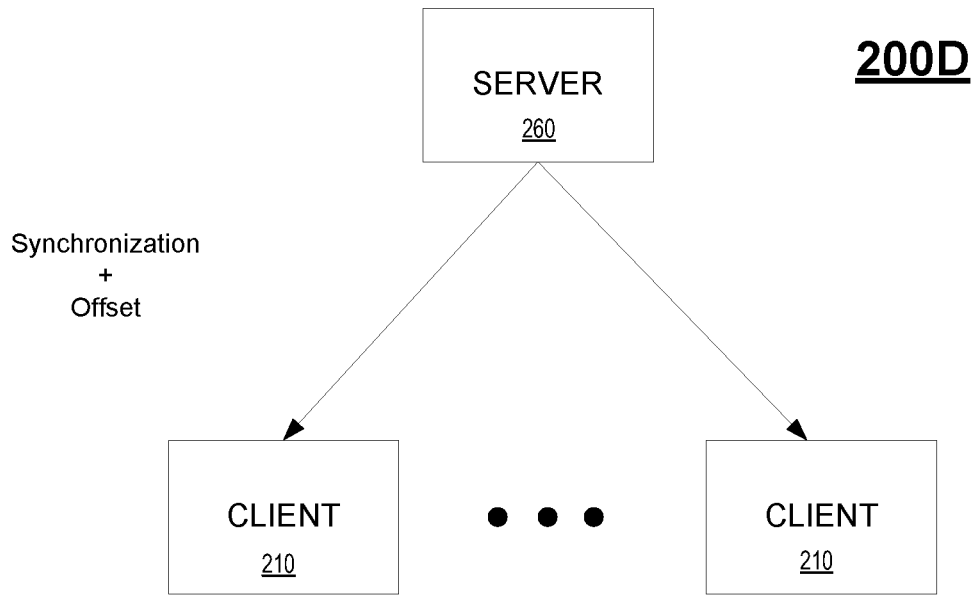
FIG. 2D illustrates a multi-tenancy configuration between a cloud gaming server and multiple clients that benefit from proper synchronization and offsetting of VSYNC signals between a source device and a target device, in accordance with one embodiment of the present disclosure.

FIG. 2D illustrates a multi-tenancy configuration between a cloud gaming server 260 and one or more clients 210 that benefit from proper synchronization and offsetting of VSYNC signals between a source device and a target device, in accordance with one embodiment of the present disclosure. In the server to client configuration, alignment may include both synchronization of the frequencies between the server VSYNC signal and client VSYNC signal, as well as providing a proper timing offset between the server VSYNC signal and client VSYNC signal. In the multi-tenancy configuration, the client VSYNC signal is tuned at each client 210 in order to implement proper alignment between a server 260 and client 210 pair, in one embodiment.

For example, a graphics subsystem may be configured to perform multi-tenancy GPU functionality, wherein one graphics subsystem could be implementing graphics and/or rendering pipelines for multiple games, in one embodiment. That is, the graphics subsystem is shared between multiple games that are being executed. In particular, a game title processing engine may include a CPU and GPU group that is configured to perform multi-tenancy GPU functionality, wherein one CPU and GPU group could be implementing graphics and/or rendering pipelines for multiple games, in one embodiment. That is, the CPU and GPU group is shared between multiple games that are being executed. The CPU and GPU group could be configured as one or more processing devices. In another embodiment, multiple GPU devices are combined to perform graphics processing for a single application that is executing on a corresponding CPU.

Figure 3:
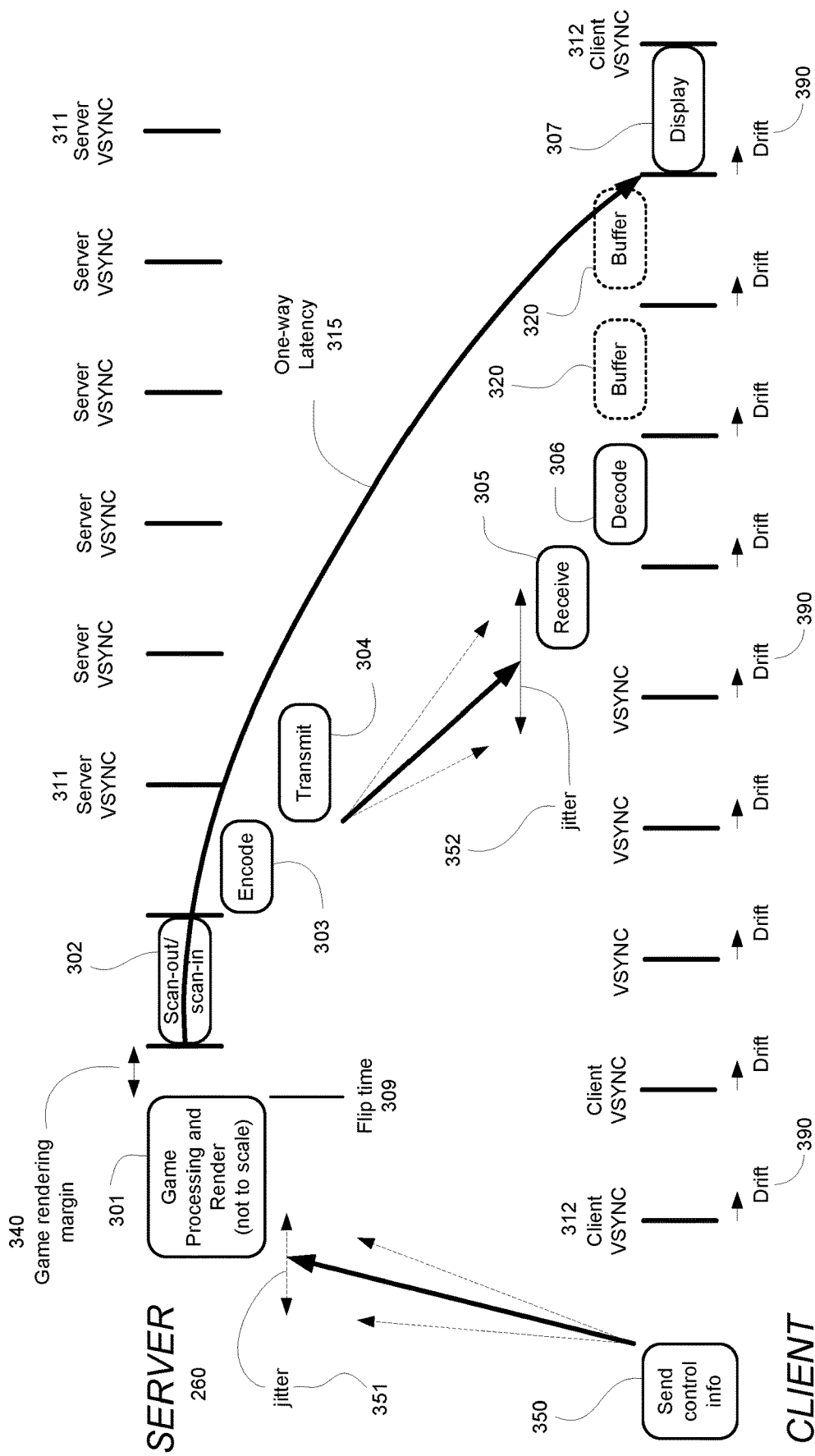
FIG. 3 illustrates the variation in one-way latency between a cloud gaming server and a client due to clock drift when streaming video frames generated from a video game executing on the server, in accordance with one embodiment of the present disclosure.

FIG. 3 illustrates the general process of executing a video game at a server to generate game rendered video frames and sending those video frames to a client for display. Traditionally, a number of the operations at the game server 260 and client 210 are performed within a frame period as defined by a respective VSYNC signal. For example, the server 260 strives to generate a game rendered video frame at 301 in one or multiple frame periods as defined by a corresponding server VSYNC signal 311. The video frame is generated by the game, either in response to control information (e.g., input commands of a user) delivered from an input device at operation 350, or game logic not driven by control information. Transmission jitter 351 may be present when sending control information to the server 260, wherein jitter 351 measures the variation of network latency from client to server (e.g., when sending input commands). As shown, the bold arrow shows the current delay when sending control information to the server 260, but due to jitter there may be a range of arrival times for control information at the server 260 (e.g. range bounded by the dotted arrows). At flip-time 309, the GPU reaches a flip command that indicates that the corresponding video frame has been completely generated and placed into the frame buffer at the server 260. Thereafter, the server 260 performs scan-out/scan-in (operation 302, wherein scan-out may be aligned with the VSYNC signal 311) for that video frame over the subsequent frame period as defined by the server VSYNC signal 311 (the VBI is omitted for clarity). Subsequently the video frame is encoded (operation 303) (e.g. encoding starts after an occurrence of the VSYNC signal 311, and the end of encoding may not be aligned with the VSYNC signal) and transmitted (operation 304, wherein transmission may not be aligned with the VSYNC signal 311) to the client 210. At the client 210, the encoded video frames are received (operation 305, wherein receive may not be aligned with the client VSYNC signal 312), decoded (operation 306, wherein decode may not be aligned with the client VSYNC signal 312), buffered, and displayed (operation 307, wherein the start of display may be aligned with the client VSYNC signal 312). In particular, the client 210 displays each video frame that is rendered for display beginning with a corresponding occurrence of the client VSYNC signal 312.

One-way latency 315 may be defined as being the latency from beginning of transfer of the video frame to the encoding unit (e.g. scan-out 302) at the server, to the beginning of display of the video frame at the client 307. That is, one-way latency is the time from server scan-out to client display, taking into account client buffering. Individual frames have a latency from beginning of scan-out 302 to completion of decode 306 that may vary from frame to frame due to the high degree of variance of server operations such as encode 303 and transmission 304, network transmission between the server 260 and client 210 with accompanying jitter 352, and client reception 305. As shown, the straight bold arrow shows the current latency when sending the corresponding video frame to the client 210, but due to jitter 352 there may be a range of arrival times for video frames at the client 210 (e.g. range bounded by the dotted arrows). As one-way latency must be relatively stable (e.g. kept fairly consistent) to achieve a good play experience, traditionally buffering 320 is performed with the result that the display of individual frames with low latency (e.g. from beginning of scan-out 302 to completion of decode 306) is delayed for several frame periods. That is, if there are network instabilities, or unpredictable encode/decode time, extra buffering is needed so that one-way latency is kept consistent.

One-way latency between a cloud gaming server and a client may vary due to clock drift when streaming video frames generated from a video game executing on the server, in accordance with one embodiment of the present disclosure. That is, differences in the frequencies of the server VSYNC signal 311 and the client VSYNC signal 312 may cause the client VSYNC signal to drift relative to the frames arriving from the server 260. The drift may be due to very slight differences in the crystal oscillators used in each of the respective clocks at the server and client. Furthermore, embodiments of the present disclosure reduce one-way latency by performing one or more of synchronization and offset of VSYNC signals for alignment between a server and a client, by providing dynamic buffering on the client, by overlapping encode and transmit of video frames at the server, by overlapping receive and decode of video frames at the client, and by overlapping decoding and displaying of video frames at the client.

Figure 4:
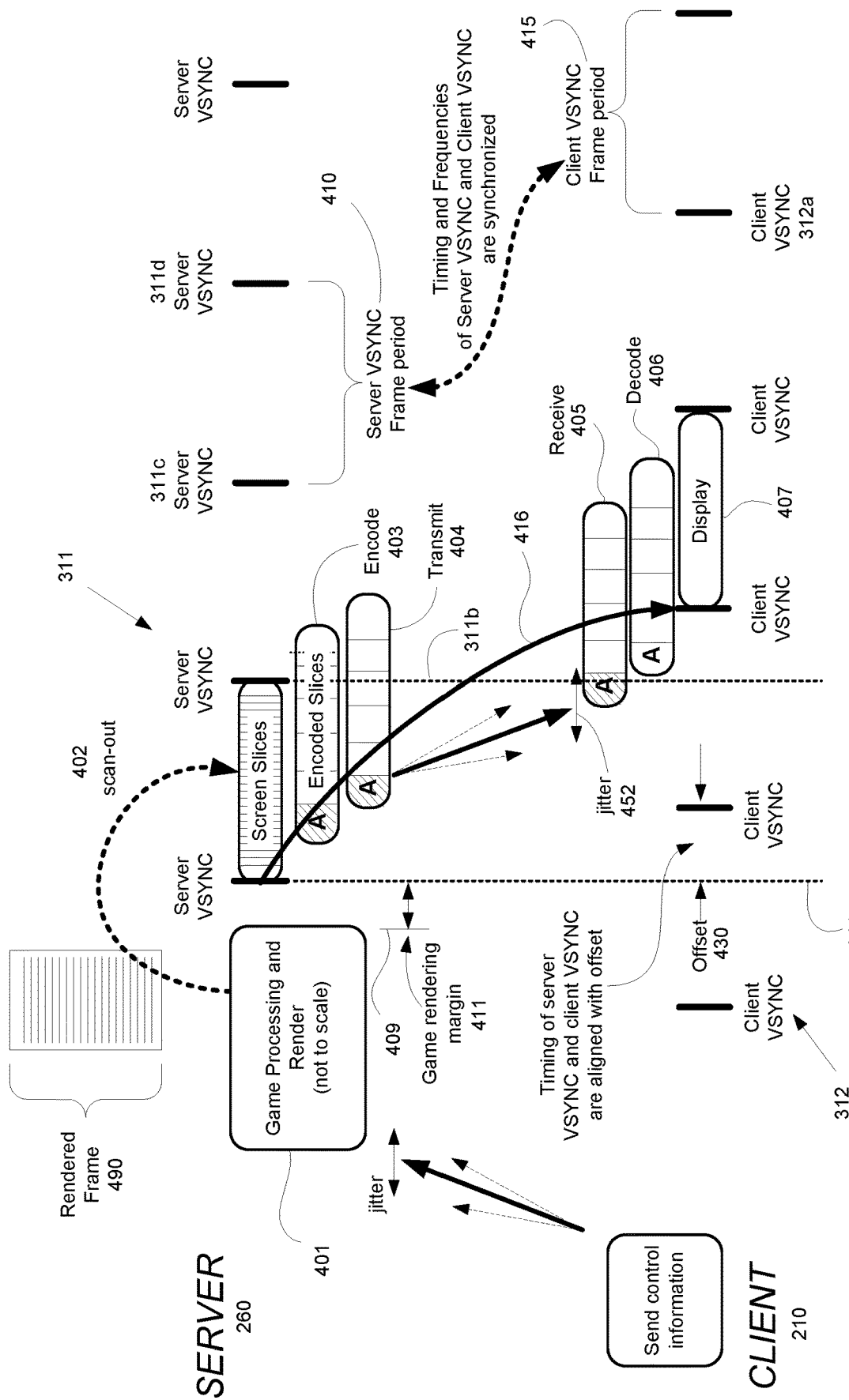
FIG. 4 illustrates a network configuration including a cloud gaming server and a client when streaming video frames generated from a video game executing on the server, the VSYNC signals between the server and the client being synchronized and offset to allow for overlapping of operations at the server and client, and to reduce one-way latency between the server and the client, in accordance with one embodiment of the present disclosure.

FIG. 4 illustrates the flow of data through a network configuration including a highly optimized cloud gaming server 260 and a highly optimized client 210 when streaming video frames generated from a video game executing on the server, wherein overlapping server operations and client operations reduces the one-way latency, and synchronizing and offsetting the VSYNC signals between the server and the client reduces the one-way latency as well as reduces variability in the one-way latency between the server and the client, in accordance with embodiments of the present disclosure. In particular, FIG. 4 shows the desired alignment between the server and the client VSYNC signals. In one embodiment, tuning of the server VSYNC signal 311 is performed to obtain proper alignment between server and client VSYNC signals, such as in a server and client network configuration. In another embodiment, tuning of the client VSYNC signal 312 is performed to obtain proper alignment between server and client VSYNC signals, such as in a multi-tenant server to multiple clients network configuration. For purposes of illustration, tuning of the server VSYNC signal 311 is described in FIG. 4 for purposes of synchronizing the frequencies of server and client VSYNC signals, and/or adjusting the timing offset between corresponding client and server VSYNC signals, though it is understood that the client VSYNC signal 312 may also be used for tuning. In the context of this patent, "synchronize" should be taken to mean tuning the signals so that their frequencies match, but phase may differ; "offset" should be taken to mean the time delay between the signals, e.g. the time between when one signal reaches its maximum and the other signal reaches its maximum.

As shown, FIG. 4 illustrates an improved process of executing a video game at a server to generate rendered video frames and sending those video frames to a client for display, in embodiments of the present disclosure. The process is shown with respect to generation and display of a single video frame at a server and client. In particular, the server generates a game rendered video frame at 401. For example, the server 260 includes a CPU (e.g., game title processing engine 211) configured for executing the game. The CPU generates one or more draw calls for a video frame, wherein the draw calls include commands placed into a command buffer for execution by a corresponding GPU of the server 260 in a graphics pipeline. The graphics pipeline may include one or more shader programs on vertices of objects within a scene to generate texture values as rendered for the video frame for displaying, wherein the operations are performed in parallel through a GPU for efficiency. At flip-time 409, the GPU reaches a flip command in the command buffer that indicates that the corresponding video frame has been completely generated and/or rendered and placed into the frame buffer at the server 260.

At 402, the server performs scan-out of the game rendered video frame to an encoder. In particular, scan-out is performed scanline by scanline, or in groups of consecutive scanlines, wherein a scanline refers to a single horizontal line, for example of a display from screen edge to screen edge. These scanlines or groups of consecutive scanlines are sometimes referred to as slices, and are referred to in this specification as screen slices. In particular, scan-out 402 may include a number of processes that modify the game rendered frame, including overlaying it with another frame buffer, or shrinking it in order to surround it with information from another frame buffer. During scan-out 402, the modified video frame is then scanned into an encoder for compression. In one embodiment, scan-out 402 is performed at an occurrence 311a of the VSYNC signal 311. In other embodiments, scan-out 402 may be performed before the occurrence of the VSYNC signal 311, such as at flip-time 409.

At 403, the game rendered video frame (which may have undergone modification) is encoded on an encoder slice by encoder slice basis at the encoder to generate one or more encoded slices, wherein an encoded slice is unrelated to a scanline or screen slice. As such, the encoder generates one or more encoded (e.g., compressed) slices. In one embodiment, the encoding process begins before the scan-out 402 process has fully completed for a corresponding video frame. Further, the start and/or end of encode 403 may or may not be aligned with the server VSYNC signal 311. The boundaries of an encoded slice are not restricted to a single scanline, and may be comprised of a single scanline, or multiple scanlines Additionally, the end of an encoded slice and/or the start of the next encoder slice may not necessarily occur at the edges of the display screen (e.g., may occur somewhere mid-screen or in the middle of a scanline), such that the encoded slice need not traverse fully from edge to edge of the display screen. As shown, one or more encoded slices may be compressed and/or encoded, including "encoded slice A" that is compressed having hash marks.

At 404, the encoded video frame is transmitted from the server to the client, wherein the transmission may occur on an encoded slice-by-slice basis, wherein each encoded slice is an encoder slice that has been compressed. In one embodiment, the transmission process 404 begins before the encoding process 403 has fully completed for a corresponding video frame. Further, the start and/or end of transmission 404 may or may not be aligned with the server VSYNC signal 311. As shown, encoded slice A that is compressed is transmitted to the client independently of the other compressed encoder slices for the rendered video frame. The encoder slices may be transmitted one at a time, or in parallel.

At 405, the client receives the compressed video frame, again on an encoded slice-by-slice basis. Further, the start and/or end of receive 405 may or may not be aligned with the client VSYNC signal 312. As shown, encoded Slice A that is compressed is received by the client. Transmission jitter 452 may be present between the server 260 and client 210, wherein jitter 452 measures the variation in network latency from the server 260 to the client 210. A lower jitter value exhibits a more stable connection. As shown, the bold straight arrow shows the current latency when sending the corresponding video frame to the client 210, but due to jitter there may be a range of arrival times for video frames at the client 210 (e.g. range bounded by the dotted arrows). Variation in latency may also be due to one or more operations at the server such as encode 403 and transmission 404, as well as networking issues that introduce latency when transmitting video frames to the client 210.

At 406, the client decodes the compressed video frame, again on an encoded slice-by-slice basis, producing decoded Slice A (shown without hash marks) that is now ready for display. In one embodiment, the decode process 406 begins before the receive process 405 has fully completed for a corresponding video frame. Further, the start and/or end of decode 406 may or may not be aligned with the client VSYNC signal 312. At 407, the client displays the decoded rendered video frame on the display at the client. That is, the decoded video frame is placed in a display buffer which is streamed out on a scanline-by-scanline basis to a display device, for example. In one embodiment, the display process 407 (i.e. the streaming out to the display device) begins after the decode process 406 has fully completed for a corresponding video frame, i.e. the decoded video frame is fully resident in the display buffer. In another embodiment, the display process 407 begins before the decode process 406 has fully completed for a corresponding video frame. That is, streamout to the display device begins from the address of the display buffer at a time at which only a portion of the decoded frame buffer is resident in the display buffer. The display buffer is then updated or filled in with remaining portions of the corresponding video frame in time for displaying, such that the updating of the display buffer is performed prior to streamout of those portions to the display. Further, the start and/or end of display 407 is aligned with the client VSYNC signal 312.

In one embodiment, the one-way latency 416 between the server 260 and the client 210 may be defined as the elapsed time between when scan-out 402 begins and when display 407 begins. Embodiments of the present disclosure are capable of aligning the VSYNC signals (e.g. synchronize the frequency and adjust the offset) between the server and the client, to reduce one-way latency between the server and the client, and to reduce variability in the one-way latency between the server and the client. For example, embodiments of the present disclosure are able to calculate an optimal adjustment to the offset 430 between server VSYNC signal 311 and client VSYNC signal 312 such that even in the event of near worst case time needed for server processing such as encode 403 and transmit 404, near worst case network latency between server 260 and client 210, and near worst case client processing such as receive 405 and decode 406, the decoded rendered video frame is available in time for the display process 407. That is, it is not necessary to determine the absolute offset between server VSYNC and client VSYNC; it is sufficient to adjust the offset so that the decoded rendered video frame is available in time for the display process.

In particular, the frequencies of the server VSYNC signal 311 and the client VSYNC signal 312 may be aligned through synchronization. Synchronization is achieved through tuning the server VSYNC signal 311 or the client VSYNC signal 312. For purposes of illustration, tuning is described in relation to the server VSYNC signal 311, though it is understood that tuning could be performed on the client VSYNC signal 312 instead. For example, as shown in FIG. 4 the server frame period 410 (e.g., the time between two occurrences 311c and 311d of the server VSYNC signal 311) is substantially equal to the client frame period 415 (e.g., the time between two occurrences 312a and 312b of the client VSYNC signal 312), which indicates that the frequencies of the server VSYNC signal 311 and client VSYNC signal 312 are also substantially equal.

To maintain synchronization of the frequencies of the server and client VSYNC signals, the timing of the server VSYNC signal 311 may be manipulated. For example, the vertical blanking interval (VBI) in the server VSYNC signal 311 may be increased or reduced over a period of time, such as to account for the drift between the server VSYNC signal 311 and the client VSYNC signal 312. Manipulation of vertical blanking (VBLANK) lines in the VBI provides for adjusting the number of scanlines used for VBLANK for one or more frame periods of the server VSYNC signal 311. Dropping the number of scanlines of VBLANK reduces a corresponding frame period (e.g., time interval) between two occurrences of the server VSYNC signal 311. Conversely, increasing the number of scanlines of VBLANK increases a corresponding frame period (e.g., time interval) between two occurrences of the VSYNC signal 311. In that manner, the frequency of the server VSYNC signal 311 is adjusted to align the frequencies between the client and server VSYNC signals 311 and 312 to be at substantially the same frequency. Also, offset between server and client VSYNC signals can be adjusted by increasing or reducing the VBI for a short period of time, before returning the VBI to its original value. In one embodiment, the server VBI is adjusted. In another embodiment, the client VBI is adjusted. In yet another embodiment, instead of two devices (server and client), there are a plurality of connected devices, each of which may have a corresponding VBI that is adjusted. In one embodiment, each of the plurality of connected devices may be independent peer devices (e.g. without a server device). In another embodiment, the plurality of devices may include one or more server devices and/or one or more client devices arranged in one or more server/client architectures, multi-tenant server/client(s) architecture, or some combination thereof.

Alternatively, the pixel clock of the server (e.g., located at the southbridge of a northbridge/southbridge core logic chipset of the server, or in the case of a discrete GPU, it would generate a pixel clock by itself using its own hardware) may be manipulated to perform coarse and/or fine tuning of the frequency of the server VSYNC signal 311 over a period of time to bring the synchronization of frequencies between server and client VSYNC signals 311 and 312 back into alignment, in one embodiment. Specifically, the pixel clock in the south bridge of the server may be overclocked or underclocked to adjust the overall frequency of the VSYNC signal 311 of the server. In that manner, the frequency of the server VSYNC signal 311 is adjusted to align the frequencies between the client and server VSYNC signals 311 and 312 to be at substantially the same frequency. Offset between server and client VSYNC can be adjusted by increasing or reducing the client server pixel clock for a short period of time, before returning the pixel clock to its original value. In one embodiment, the server pixel clock is adjusted. In another embodiment, the client pixel clock is adjusted. In yet another embodiment, instead of two devices (server and client), there are a plurality of connected devices, each of which may have a corresponding pixel clock which is adjusted. In one embodiment, each of the plurality of connected devices may be independent peer devices (e.g. without a server device). In another embodiment, the plurality of connected devices may include one or more server devices and one or more client devices arranged in one or more server/client architectures, multi-tenant server/client(s) architecture, or some combination thereof.

Figure 5A:
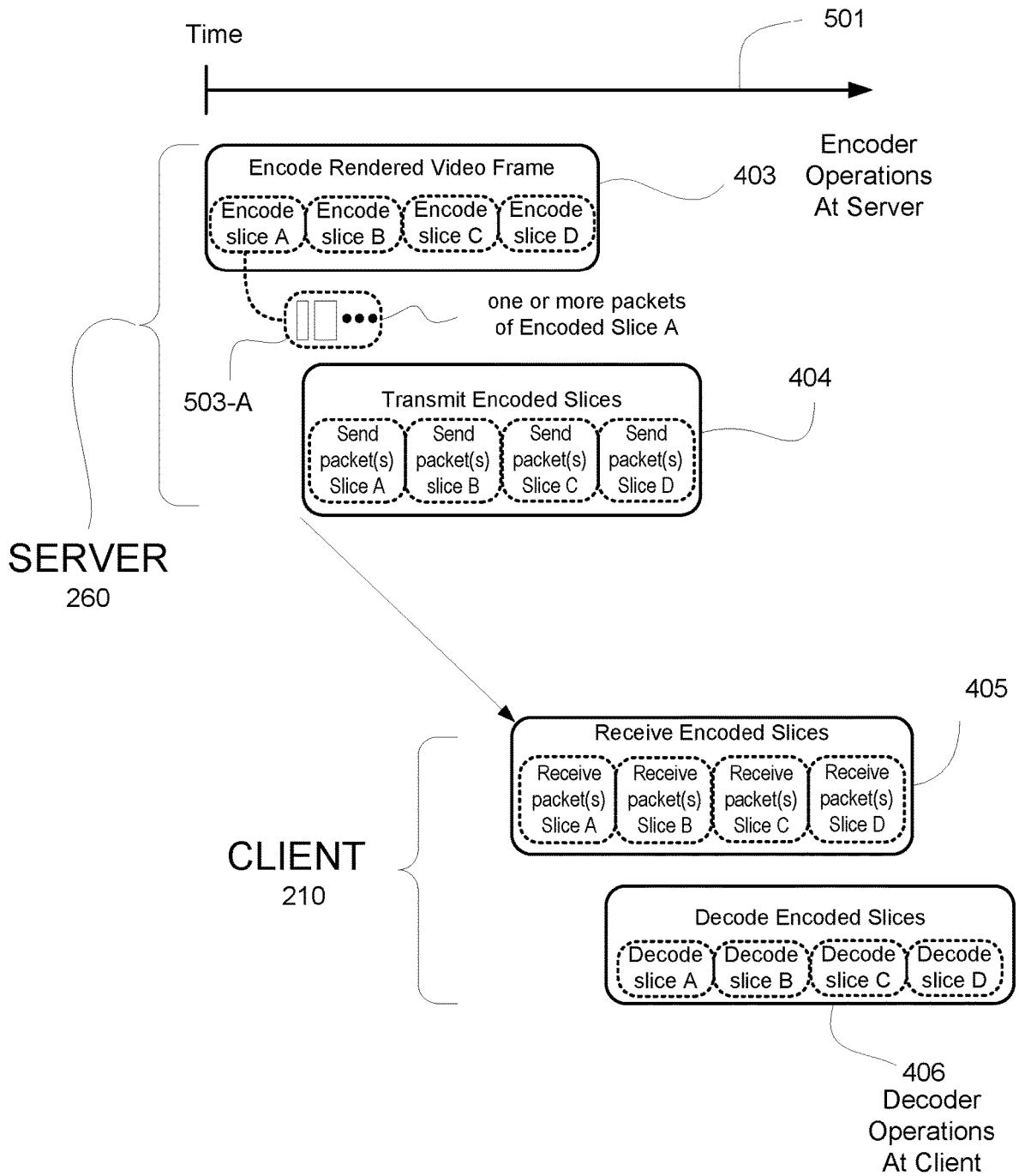
FIG. 5A is a diagram illustrating overlapping of encode and send operations at the server and receive and decode operations at the client when streaming video frames generated from a video game executing on the server, in accordance with one embodiment of the disclosure.

FIG. 5A is a diagram illustrating overlapping of encode and transmit operations at the server 260, and receive and decode operations at the client 210 when streaming video frames generated from a video game executing on the server, in accordance with one embodiment of the disclosure. In particular, the overlapping of the encode and transmission operations of video frames at the server 260, and the overlapping of receive and decode operations of video frames at the client 210 can be performed at the encoder slice level with reference to a timeline 501.

In particular, a rendered video frame is generated by server 260 that is executing a video game. For instance, video frames are generated as the video game is executing on a CPU in combination with a GPU graphics pipeline of the server 260. Each video frame may be split into one or more encoder slices that are then compressed—as one or more encoded slices. As previously described, the boundaries of an encoded slice are not restricted to a single scanline, and may be comprised of a single scanline, or multiple scanlines Additionally, the end of an encoded slice and/or the start of the next encoded slice may not necessarily occur at the edges of the display screen (e.g., may occur somewhere mid-screen or in the middle of a scanline).

Further, each encoded slice (e.g., compressed) may include one or more packets (e.g., user datagram protocol—UDP). If an encoded slice exceeds a maximum transmission unit (MTU), then the encoded slice is split into multiple packets, each sized to the MTU or smaller. The MTU defines the maximum size of a packet when sent over UDP. For example, encoded slice A may be split into one or more packets 503-A. Similarly, encoded slice B, encoded slice C, and encoded slice D may each be split into one or more packets.

At the server 260, one or more packets of an encoded slice may be compressed and delivered separately (and possibly grouped by the slice) without waiting for all the encoder slices (e.g., of a video frame) to be compressed (e.g., into encoded slices) and packetized. This may require information (e.g., amount of data encoded at a given time) to be shared within the server 260, such as between the encode unit and those units (e.g., streamer operating at the application layer) performing the transmission of data. In particular, at operation 403 the encoder receives the generated video frame and encodes the video frame on an encoder slice-by-slice basis to generate one or more encoded slices. In some embodiments, the encoder receives a video frame generated by a video game that has been modified with additional layers or overlays (e.g., during a scan-out process), as previously described. As shown, each of the encoded slices of the generated video frame is compressed separately at the encoder. For example, in the encoding process of operation 403 the generated video frame is encoded into encoded slice A (e.g., compressed), encoded slice B, encoded slice C, and encoded slice D. Depending on the number of processors or the hardware, multiple slices can be encoded simultaneously (e.g., in parallel), in some embodiments. For example, some gaming consoles can generate four encoded slices in parallel. More particularly, hardware encoders may be configured to compress multiple encoder slices (e.g., to generate one or more encoded slices) in parallel due to the hardware pipelining.

At operation 404, the encoded slices are transmitted over a network to a client 210. In particular, the encoded slices are delivered from the encoder to a streamer device that is configured to transmit the encoded slices over the network to the client 210. For example, the streamer device is configured to operate at the application layer of a transmission control protocol/internet protocol or UDP/IP computer networking model. As shown, the encoding and transmission processes may be overlapped, in accordance with one embodiment of the present disclosure. For example, each of the encoded slices (e.g., compressed) is transmitted separately, such that the one or more packets of a corresponding encoded slice are sent as a group before the packets of the next encoded slice can be sent. In particular, once compressed, a corresponding encoded slice (e.g., one or more packets of the encoded slice) is then ready for transmission by the streamer at operation 404 without waiting for all the encoder slices to be compressed for the corresponding video frame. As shown, in timeline 501 encoded slice A is transmitted by the streamer while encoder slice B is being compressed (e.g., into encoded slice B) by the encoder, and before encoder slices C and D have begun the encoding process. More specifically, packets of encoded slice A is transmitted by the streamer over the network to client 210 before encoder slice B has been compressed by the encoder. Similarly, encoded slice B is transmitted by the streamer while encoder slice C is being compressed by the encoder, and before encoder slice D has begun the encoding process. In the case where multiple slices can be encoded simultaneously (e.g., X number of slices encoded in parallel), then X number of encoded slices could be sent while the next X number of encoder slices are being encoded (e.g., compressed). As such, in embodiments of the present disclosure, transmission of data (e.g., encoded slices and/or packets of corresponding encoded slices) from server to client may begin as soon as a corresponding encoder slice and/or packets of an encoder slice have been encoded and/or compressed, and before the full video frame has been encoded (as is traditionally done). In that manner, one-way latency between the server and client may be reduced by beginning transmission of data from the server to the client as soon as a packet's worth of data is encoded by the server.

At the client 210, the process includes receiving the compressed video frame (e.g., the encoded slices of the video frame), and then decoding the compressed video frame. At the client, the receiving and decoding process may also be performed at the encoded slice level, such that once the one or more packets of a corresponding encoded slice are received, that encoded slice is then decoded using those one or more packets. As such, the receiving and decoding processes may be overlapped at the client. In particular, at the client 210 one or more encoded slices of a corresponding video frame are received separately at operation 405. For illustration purposes, in the timeline 501 encoded slice A may be received first, then encoded slice B, and so on until encoded slice D is received last.

In particular, at operation 406, the received encoded slices are then decoded. In particular, once received, a corresponding encoded slice that is received is then ready for decoding by the decoder at operation 406 without waiting for all the encoded slices to be received for the corresponding video frame. For example, in timeline 501 the one or more packets of encoded slice A are decoded while encoded slice B is being received, and while encoded slice C and encoded slice D are still in transmission over the network. Similarly, one or more packets of encoded slice B are decoded while encoded slice C is being received, and while encoded slice D is in transmission over the network. As such, in embodiments of the present disclosure, decoding of data (e.g., encoded slices and/or packets of encoded slices) from server to client may begin as soon as the encoded slice and/or packets of an encoded slice are received, and before the full complement of encoded slices and/or corresponding packets of those encoded slices for the video frame have been received. In that manner, one-way latency between the server 260 and client 210 may be reduced by beginning decoding of data as soon as a packet's worth of data is received by the client 210.

It is appreciated that encoded slices of a corresponding video frame may be received at the client in various random orders (e.g., due to network jitter), and may be received in parallel depending on the hardware configuration at the client. That is, in operation 405 the encoded slices that are transmitted may be received at client 210 out of sequence due to jitter. In that case, it may be possible to decode encoded slices out of order to account the jitter (e.g., receiving encoded slices of a corresponding video frame out of order). For example, in a sequence of encoded slices for a corresponding video frame being transmitted over the network, when one encoded slice is received out of order, the decoding is also performed out of order. That is, the decoding still occurs as each encoded slice is received.

More particularly, each of the encoded slices of a corresponding video frame may be split into one or more network packets at the encoder of the server 260, which are then transmitted over a network to the client 210. As such, client 210 receives the one or more packets for each of the one or more slices of a corresponding video frame before slices and/or corresponding packets of slices of the next video frame are received. That is, the one or more encoded slices for a corresponding video frame may be received one at a time or in parallel at the client, and before the one or more encoded slices of the next video frame are being received, in one embodiment. More specifically, the packets for the one or more encoded slices of a corresponding video frame may be received one at a time or in parallel at the client, and before the one or more encoded slices of the next video frame are being received.

Figure 5B:
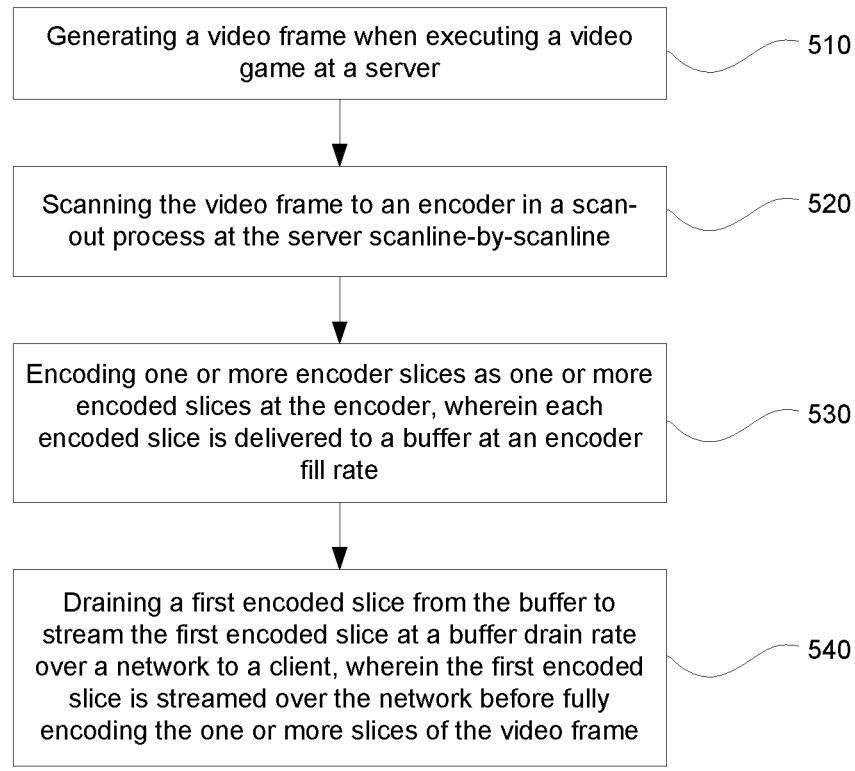
FIG. 5B is a flow diagram illustrating a method for cloud gaming, wherein encode and send operations at the server are overlapped to reduce one-way latency between the server and the client, in accordance with one embodiment of the disclosure.

With the detailed description of the various client devices 210 and/or the cloud gaming network 290 (e.g., in the game server 260) of FIGS. 2A-2D, flow diagram 500B of FIG. 5B illustrates a method for cloud gaming in which server operations may be overlapped to reduce one-way latency between the cloud gaming server and the client, in accordance with one embodiment of the present disclosure.

At 510, the method includes generating a video frame when executing a video game at a server. For example, the server may be executing a video game in a streaming mode, such that the CPU of a server executes a video game responsive to input commands from a user in order to generate game rendered video frames using a graphics pipeline that can be used for streaming. In particular, a CPU executing the video game in cooperation with a GPU graphics pipeline are configured to generate a plurality of video frames. In cloud gaming, the game generated video frames are typically rendered for display on a virtual display. The server may perform additional operations on the game generated video frames. For example, one or more overlays may be added to a corresponding game generated video frame, such as during a scan-out process.

At 520, the method includes scanning-in the game generated video frame to an encoder at the server scanline-by-scanline. As previously described, the game generated video frame may be modified during a scan-out process, such as adding one or more overlays. As such, the optionally modified game generated video frame is scanned into the encoder for compression in preparation of streaming the video frame to a client.

At 530, the method includes encoding one or more encoder slices for the corresponding video frame as one or more encoded slices. That is, the video frame is being compressed into a compressed video frame including one or more encoded slices. As previously described, each encoded slice may be configured into one or more scanlines, wherein the minimum size of an encoded slice is one scanline, and wherein the end of an encoded slice may not necessarily occur at the edge of a display screen.

After encoding, the one or more encoded slices are delivered to a buffer. The rate of filling the buffer is dependent on the capabilities of the encoder, such that each encoded slice is delivered to the buffer at an encoder fill rate. For example, the buffer may be filled as fast as the encoder is able to encode video frames, and more particularly as fast as the encoder is able to generate encoded slices and/or packets of the encoded slices.

In addition, one or more forward error correction (FEC) slices may be generated for the corresponding video frame that is being compressed by the encoder. The one or more FEC slices may be used by the client to correct any encoded slices that are lost during transmission to the client. In one embodiment, the one or more FEC slices may be interleaved within the one or more encoded slices during streaming That is, for a corresponding video frame having multiple encoded slices and multiple FEC slices, the FEC slices may be interleaved within the encoded slices during streaming. For example, a FEC slice used to correct a set of encoded slices may be delivered right after each of the encoded slices in the set is delivered.

At 540, the method includes draining a first encoded slice from the buffer to stream the first encoded slice at a buffer drain rate over a network to a client. That is, the first encoded slice is delivered over the network to the client, wherein the client is configured to receive and decompress the compressed video frame for rendering to a display. More particularly, one or more packets of the first encoded slice are drained from the buffer at the drain rate for streaming. In one embodiment, at least one encoded slice of the video frame is drained before the whole video frame is encoded. In one embodiment, the first encoded slice is streamed over the network before fully encoding the one or more slices of the corresponding video frame.

Figure 6:
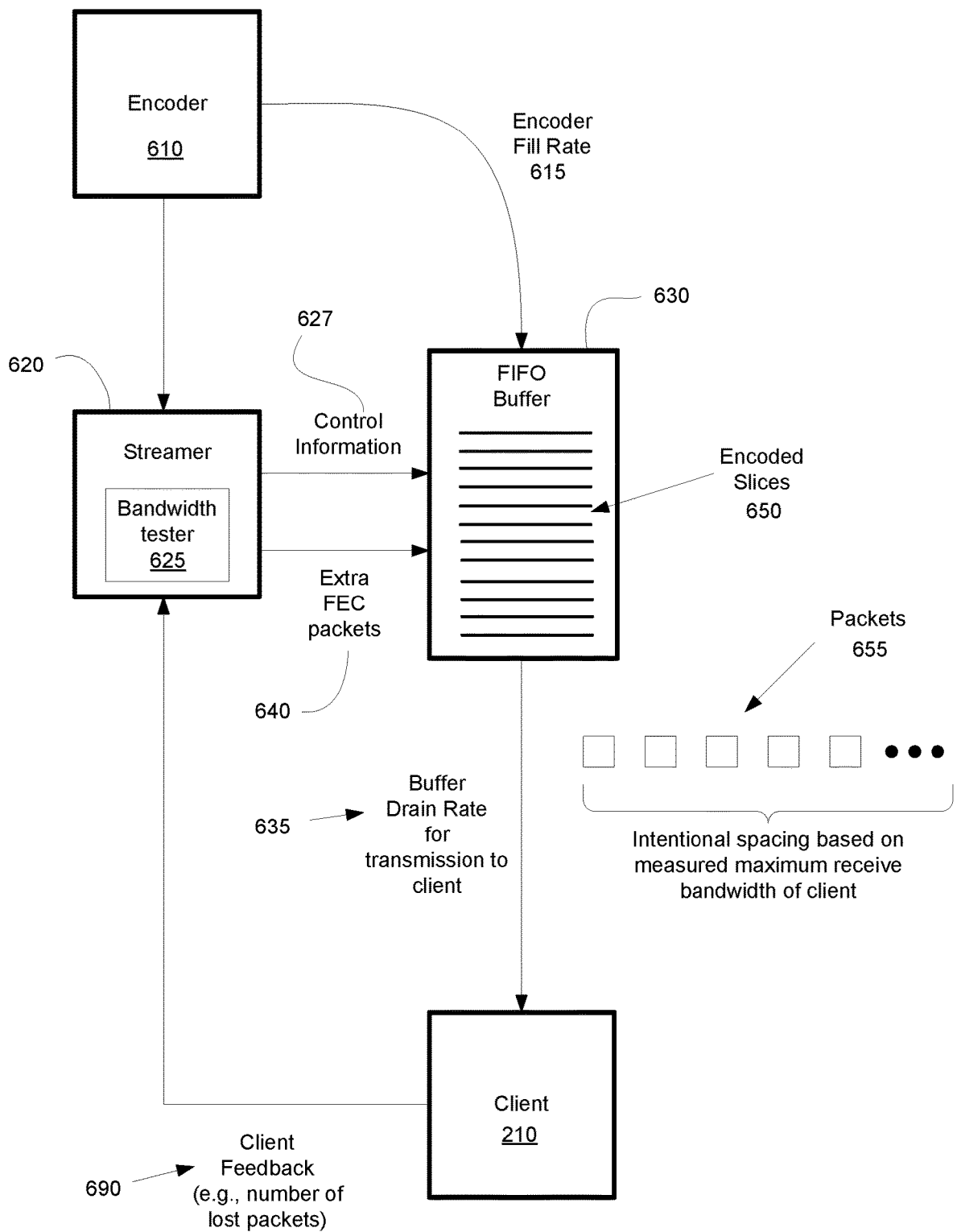
FIG. 6 is a diagram illustrating the spacing of encoded slices of video frames that is based on the maximum receive bandwidth of the client, when streaming video frames generated from a video game executing on the server, in accordance with one embodiment of the disclosure.

In one embodiment, the drain rate is dynamically adjusted to be approximately equal to the measured maximum receive bandwidth of the client. In particular, transmission of a plurality of encoded slices of a plurality of video frames that is compressed is performed by spacing the encoded slices according to the measured maximum receive bandwidth of the client. In that manner, the buffer drain rate is decoupled from the encoder fill rate, in one embodiment. In particular, FIG. 6 is a diagram illustrating the spacing of a plurality of encoded slices of a plurality of video frames, wherein the spacing is based on the maximum receive bandwidth of the client 210 when streaming video frames generated from a video game executing on the server, in accordance with one embodiment of the disclosure.

In one embodiment, it is beneficial to tune an encoder/decoder (codec) 610 or codec usage so that the size of packets for corresponding encoded slices corresponds to natural quantities of data being created by the codec in order to reduce buffering and latency. An encoded slice (e.g., compressed) may include one or more packets that are then delivered over the network to a client. In one embodiment, packet size is tied to the maximum transmission unit (MTU). When a video encoder slice that is compressed (into an encoded slice) exceeds the MTU, the encoded slice is split into several packets, each sized to be equal to or less than the MTU.

One consequence of encoded slices that are larger than the MTU is that the incurred packet loss rate and the amount of visual corruption will increase when packet loss occurs. For example, if a compressed encoder slice is split into three packets during encoding, and one of the packets is lost enroute to the client, the entire encoder slice becomes invalid at the client, such that losing a single packet results in an effective loss of three packets. As such, in one embodiment the packet size can be tuned to natural quantities of data being created by the codec (e.g., the MTU). In one implementation the packet size is tuned to correspond to a UDP packet size. In another implementation, the packet size can be tuned to correspond to a screen slice (e.g., from edge to edge of a screen), wherein the packet size and encoded slice correspond to the MTU. That is, an encoded slice is sized to the MTU, and can be delivered as one packet. This may increase the number of encoded slices of a corresponding video frame. When the packet size is tuned to correspond to something natural in the codec at the server side (e.g., MTU size and/or encoded slice), it makes it possible to decode the packets on the client side as soon as each of the packets arrive.

In one embodiment, the compressed video frames are transmitted from the server at a rate based on the maximum available bit rate or bandwidth over the network to the client at a particular point in time. That is, the rate of transmission of encoded slices of the compressed video frames is adjusted dynamically according to the currently measured maximum bandwidth. As such, packets 655 of the encoded slices 650 are spaced out for delivery according to the maximum available bit rate or maximum bandwidth to the client. That is, instead of spacing out the packet deliveries according to the bit rate of the codec (e.g., coupling encoder fill rate 615 to the buffer drain rate 635), the packets 655 are delivered (at a buffer drain rate 635 that is tied to the maximum bandwidth of the client) according to the maximum bandwidth of the client 210 (e.g., decoupling the encoder fill rate 615 from the buffer drain rate 635). In that manner, packets 655 can be received at the client 210 at a higher rate. In one embodiment, the encoding of packets is performed at the same rate that they are transmitted, such that both operations are dynamically tuned to the maximum available bandwidth available to the client.

In addition, at the server additional information may include the maximum send rate which defines the total network throughput (e.g., bandwidth) that the server thinks is available to the client. This maximum send rate may be determined by the server by tracking the amount of bandwidth sent to the client for a range of packets, coupled with a message from the client to the server, indicating how much packet loss occurred for the same range of packets. This may be used to determine the maximum rate that encoded slices of video frames can be sent out. The maximum rate will fluctuate based on the stability of the network connection to the client, and the offset can be dynamically adjusted to accommodate the fluctuation. Further, the maximum send rate can be adjusted independently of encoder parameters, such that slices can be sent out quicker if the encoder is configured to not produce slices at the maximum send rate.

In one embodiment, the maximum bandwidth at the client is determined by means of a feedback mechanism from the client. In particular, the streamer 620 operating at the application layer measures the maximum bandwidth of the client, such as using bandwidth tester 625. As previously described, the application layer is used in the UDP suite of protocols used to interconnect network devices over the internet. For example, the application layer defines the communications protocols and interface methods used for communicating between devices over an IP communications network. During the test, the streamer 620 provides extra FEC packets 640 so that the buffer 630 (e.g., first-in/first-out FIFO buffer) can stream packets at a predefined bit rate, such as a tested maximum bandwidth. In one embodiment, the client returns as feedback 690 to the streamer 620 a number of packets it has received over a range of incremental sequence identifiers (IDs), such as for a range of video frames. For example, the client may report something like, 145 of 150 video frames received for sequence IDs 100 to 250 (e.g., 150 video frames). As such, the streamer 620 at the server 260 is able to calculate the packet loss, and since the streamer 620 knows the amount of bandwidth that was being sent (e.g., as tested) during that sequence of packets, the streamer 620 can dynamically determine what the client's maximum bandwidth is at a particular moment in time. The measured maximum bandwidth of the client may be delivered from streamer 620 to the buffer 630 as control information 627, so that the buffer 630 can dynamically transmit packets at a rate that is approximately equal to the maximum bandwidth of the client.

The client 210 is unable to make this determination because the amount of bandwidth being sent is constantly fluctuating due to variable bitrate, scene complexity, etc. As such, the client 210 does not know if the server is sending the maximum bandwidth that the client can handle at any given moment. For example, the maximum bandwidth may be 15 Mbps (megabits per second), but because the scene complexity may be low due to the user being on a menu, as a result, only 2 Mbps is being sent. Hence, if the client reports 0% packet loss, this does not tell the server 260 if the client 210 can handle a maximum bandwidth of 15 Mbps. Hence, only when the server 260 is sending the maximum bandwidth can the true maximum bandwidth be determined.

Figure 7A:
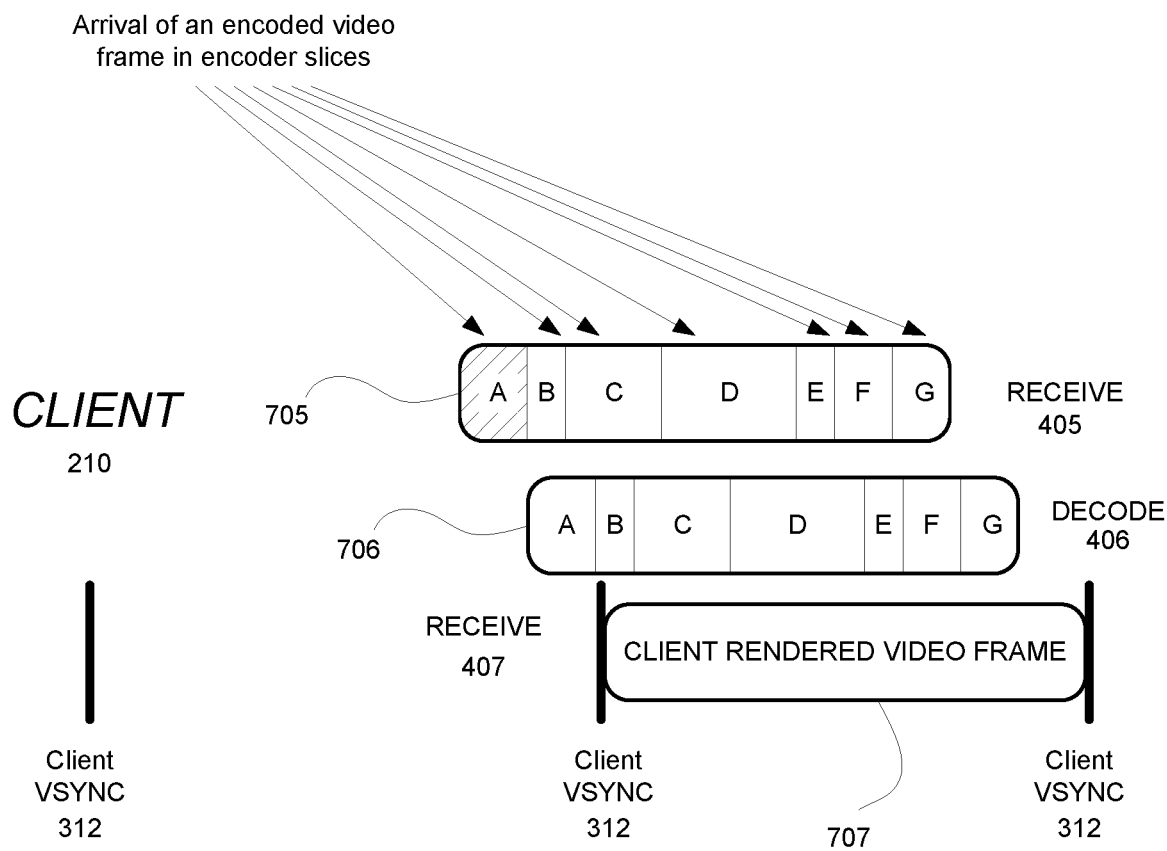
FIG. 7A is a diagram illustrating the overlapping of receive and decode operations at the client when streaming video frames generated from a video game executing on the server, in accordance with one embodiment of the disclosure.

FIG. 7A is a diagram illustrating the overlapping of receive and decode operations at the client when streaming video frames generated from a video game executing on the server to reduce one-way latency between the server and client, in accordance with one embodiment of the disclosure. In addition, receive, decode, and the rendering of decompressed video frames for display (e.g., display operations) may be overlapped at the client to reduce one-way latency between the server and client, in accordance with one embodiment of the present disclosure.

In particular, the client 210 receives a compressed video frame 705 at operation 405, wherein a server (not shown) executes a video game to generate a game rendered video frame which is then encoded at an encoder at the server and delivered to the client as the compressed video frame 705. The compressed video frame 705 includes one or more encoded slices, such as encoded slice A (which is hashed), as previously described. For example, the compressed video frame 705 includes encoded slices A through G. Each of the encoded slices may be of different sizes. For example, encoded slice D is larger than encoded slice E. Further, each of the slices may be split into one or more packets.

The client 210 includes a decoder that is configured for decoding the one or more encoded slices (e.g. decoded slice A—which is not hashed) of a corresponding compressed video frame at operation 406. In one embodiment, the decode process begins before the corresponding compressed video frame is fully received at the client. That is, decoding of an encoded slice for a corresponding video frame begins before all of the encoded slices of the corresponding video frame is received. Because the decoder decodes on an encoded slice-by-slice basis, the decoded video frame 706 includes one or more encoder slices (as decoded). Thereafter, the decoded video frame 706 is then prepared for displaying, such as rendering the information in the decoded video frame 706 into scanlines or screen slices. As such, the client rendered video frame 707 is ready for display.

In a fault intolerant mode, one-way latency between the server and client can be reduced by having the client 210 begin the display of a video frame at operation 407 before the video frame has been completely decoded at operation 406, in accordance with one embodiment of the present disclosure. In particular, one or more decoded slices of a video frame may be prepared for rendering to a display before the compressed video frame has been fully decoded. That is, the display operation at 407 overlaps the decode operation at 406. In particular, the first encoded slice (e.g., slice A) must arrive and be decoded before client scan-out begins to the display. In addition, all subsequent encoded slices must arrive and be decoded before their respective decompressed data is rendered and scanned out for display.

Further, in addition to overlapping the receiving and decoding operations at the client, the display of one or more decoded slices that are then rendered in preparation for displaying can occur even before the compressed video frame sent by the server has been fully received at the client 210. That is, one or more of the receive, decode, and display operations at the client may be overlapped for a corresponding video frame.

Moreover, when overlapping multiple operations at both the server and the client, one or more decoded slices of a video frame that are then rendered in preparation for displaying can be displayed at the client even before the scan-out operation at the server has fully completed, in accordance with one embodiment of the present disclosure. As previously described, scan-out delivers the game rendered video frame to the encoder at the server, wherein the game rendered video frame may be optionally modified (e.g., adding overlays) during a scan-out process.

Figure 7B:
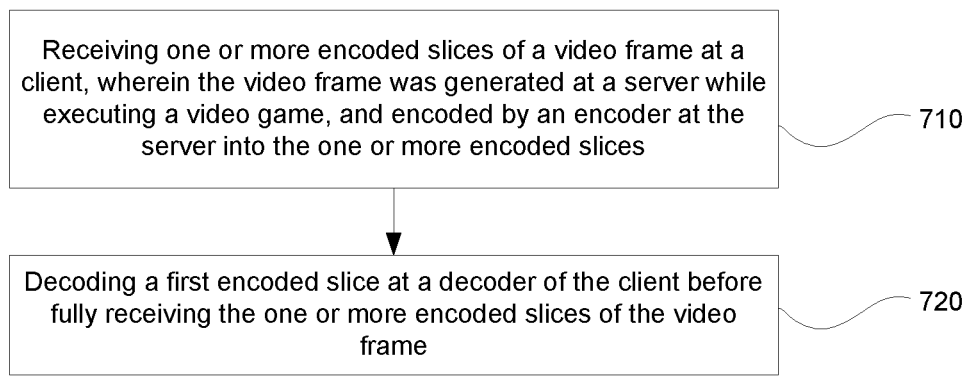
FIG. 7B is a flow diagram illustrating a method for cloud gaming, wherein receive and decode operations at the client are overlapped to reduce one-way latency between the server and the client when streaming video frames generated from a video game executing on the server, wherein the rendering of decompressed video frames may also be overlapped with receive and decode operations, in accordance with one embodiment of the disclosure.

With the detailed description of the various client devices 210 and/or the cloud gaming network 290 (e.g., in the game server 260) of FIGS. 2A-2D, flow diagram 700B of FIG. 7B illustrates a method for cloud gaming in which client operations may be overlapped to reduce one-way latency between the cloud gaming server and the client, in accordance with one embodiment of the present disclosure. In particular, FIG. 7B is a flow diagram illustrating the overlapping of receive and decode operations at the client to reduce one-way latency between the server and the client when streaming video frames generated from a video game executing on the server, wherein the rendering of decompressed video frames may optionally also be overlapped with receive and decode operations, in accordance with one embodiment of the disclosure.

At 710, the method includes receiving one or more encoded slices of a compressed video frame at a client. In particular, a plurality of video frames is generated at the server responsive to processing of a video game by the server in a streaming mode during a session with the client. The plurality of video frames is encoded at the encoder into a plurality of compressed video frames, each corresponding compressed video frame including one or more corresponding encoded slices. The plurality of compressed video frames is transmitted to the client over a network, and more particularly, the encoded slices of the plurality of compressed video frames are transmitted to the client.

At the client, the method includes receiving the plurality of compressed video frames at a decoder, and decompressing the plurality of compressed video frames for rendering to a display associated with the client, wherein these operations may be overlapped. In particular, at 720, the method includes decoding a first encoded slice at the client before fully receiving the one or more encoded slices of the corresponding compressed video frame.

Figure 8A:
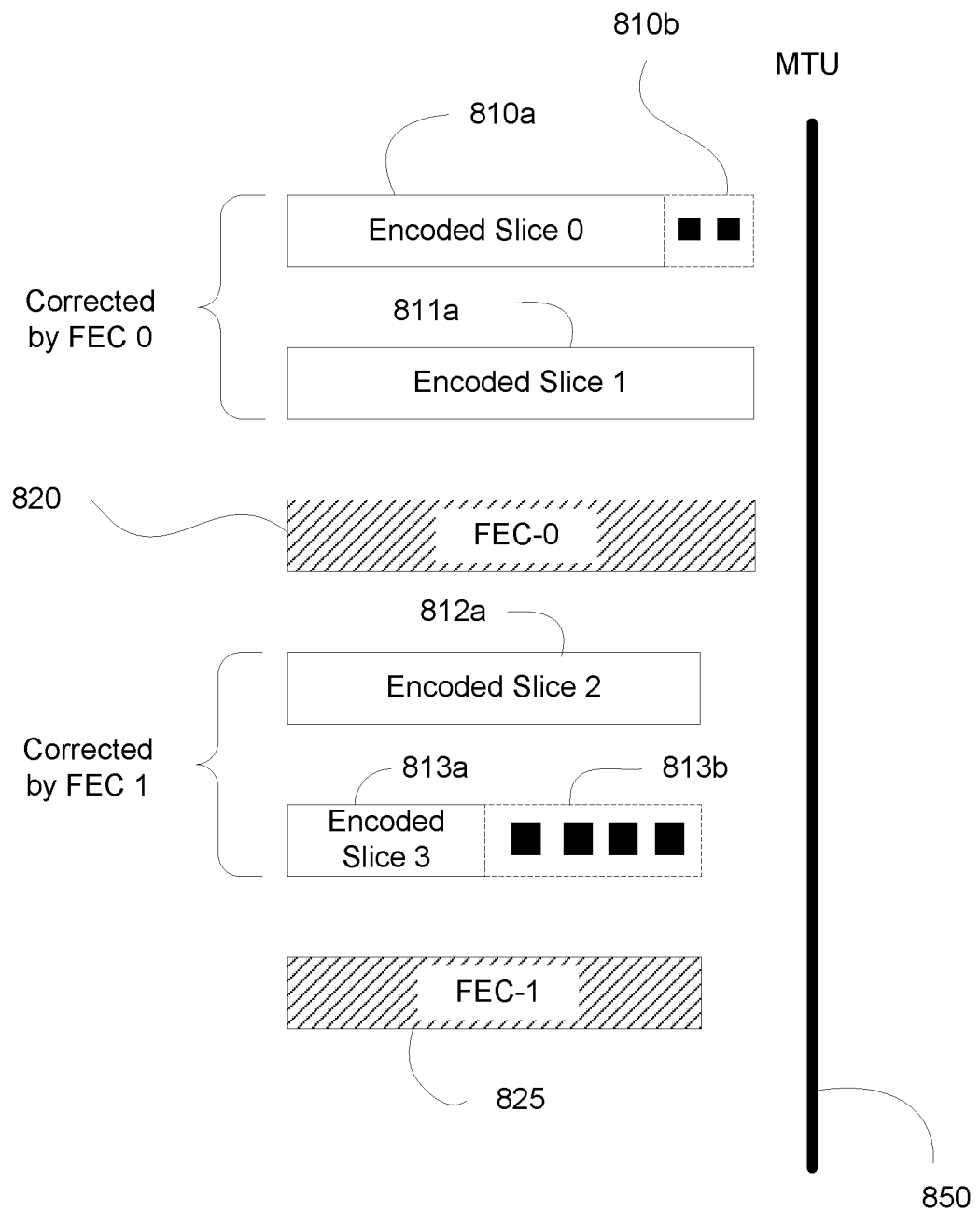
FIG. 8A is a diagram illustrating the interleaving of forward error correction (FEC) packets within encoded slices of a video frame when streaming video frames generated from a video game executing on the server, in accordance with one embodiment of the disclosure.

FIG. 8A is a diagram illustrating the interleaving of forward error correction (FEC) packets within encoded slices of a video frame when streaming video frames generated from a video game executing on the server, in accordance with one embodiment of the disclosure. Interleaving of FEC data between encoded slices of a corresponding video frame allows for overlapping of receive, decode, and render for display operations at the client, which may be performed on an encoded slice-by-slice basis. In particular, forward error correction provides for reconstruction of lost encoded slices and/or reconstruction of lost packets of encoded slices of a corresponding video frame. As such, forward error correction allows for the display of an encoded slice that is received, decoded and rendered for display at the client before one or more subsequent encoded slices have been received and/or decoded.

For example, an encoded slice may be partitioned into one or more network packets. A FEC packet may be used to correct one or more packets associated with a slice. As such, FEC packets may be interleaved within the data packets of a corresponding compressed video frame (e.g., within packets of encoded slices) to speed up recovery of lost packets using FEC. That is, instead of putting FEC packets at the end of the packet grouping for a corresponding compressed video frame, FEC packets are interleaved within the data packets. In that manner, as soon as one or more data packets of a corresponding compressed video frame are lost, those lost packets can be recovered almost immediately using corresponding FEC packets. In particular, the recovery of a lost packet of a corresponding compressed video frame can occur without waiting for the entire set of data packets to be delivered. This is because a corresponding FEC packet is delivered after data packets that that FEC packet can recover. As such, the FEC packet that is received earlier (e.g., during transmission of encoded slices of a corresponding compressed video frame) and possibly before all data packets have been received for the compressed video frame can be used to recover one or more lost packets. That is, in embodiments of the present disclosure, forward error correction can be performed earlier (e.g., during the receiving of a compressed video frame) to correct for missing and/or corrupted packets of encoded slices without waiting for the entire set of packets of a compressed video frame (e.g., data and FEC) to be received by the client. Typically, forward error correction of any packet of a compressed video frame is performed after receiving all of the packets for that compressed video frame—thereby adding to one-way latency between the server and client, wherein embodiments of the disclosure perform forward error correction while the client is still receiving the compressed video frame—thereby reducing one-way latency. As such, by interleaving FEC packets within data packets of a corresponding compressed video frame, this provides for overlapping the decode and display operations at the client.

In addition, when packets are tuned to the MTU, this may allow for easier recovery from packet loss, in accordance with one embodiment of the present disclosure. That is, since a packet is tuned and/or sized to an encoded slice (i.e., one-to-one relationship between an encoded slice and corresponding packet), a complete encoded slice that is lost may be recovered using a corresponding FEC. In that manner FEC creation is done across a data packet, such that a FEC packet can be used to correct one or more corresponding data packets, wherein each data packet corresponds to an encoded slice. As shown in FIG. 8A, each of the encoded slices is sized at or below the MTU 850, such that each encoded slice is transmitted over the network using one corresponding packet.

FIG. 8A shows the interleaving of FEC packets within packets of compressed encoder slices of an encoded video frame, in accordance with one embodiment of the present disclosure. Purely for example, the encoded video frame may include encoded slice 0, encoded slice 1, encoded slice 2, and encoded slice 3. Also, the encoded slices may be sized to be an MTU 850 or smaller. As shown, FEC-0 and FEC-1 are interleaved with data packets for encoded slice 0, encoded slice 1, encoded slice 2, and encoded slice 3.

In particular, packet 810*a* is created for encoded slice 0 during compression, wherein encoded slice 0 is sized to be compressed into one packet. Encoded slice 0 may include a padded portion 810*b* for purposes of FEC creation and recovery. It is important to note that only packet 810*a* is transmitted from the server to the client, as the padded portion 810*b* is stripped prior to transmission in one embodiment, but may be considered at the client for purposes of recovery. Similarly, packet 811*a* is created for encoded slice 1 during compression, wherein encoded slice 1 may be sized to be compressed into one packet. Encoded slice 1 does not include a corresponding padded portion for FEC creation, as it is the largest packet in the set of packets that is recovered during FEC, as is described below.

FEC-0 is generated as packet 820, and is transmitted after the packets of encoded slice 0 and encoded slice 1. FEC-0 820 can be used to correct for each of those encoded slices that may be lost, and/or may be used to correct for lost packets of each of those compressed encoded slices. The packet size of packet 820 for FEC-0 may dictate the size of the padding used for encoded slice 0 and encoded slice 1 that have been compressed for purposes of performing FEC creation and recovery. That is, a FEC packet is created based on block sizing, wherein the size of the FEC packet is tuned to the size of largest data packet in the set of data packets that can be corrected using that corresponding FEC packet. As such, FEC creation requires knowledge of the sizing of data packets in the set. However, rather than waiting for each of the data packets, in the set of data packets corresponding to a FEC packet, to be generated before transmitting any of the data packets in the set for purposes of FEC creation, data packets in the set can be transmitted immediately upon compression.

Specifically, packet 810*a* for encoded slice 0 may be transmitted as soon as it is compressed at the encoder of the server without waiting for the generation of FEC-0, and may be stored or buffered for FEC creation. Also packet 811*a* for encoded slice 1 may be transmitted as soon as it is compressed at the encoder of the server, also without waiting for the generation of FEC-0, and may be stored or buffered for FEC creation. Because a FEC packet is created using block sizing, the size of each of the data packets needs to be communicated before creating the corresponding FEC packet that can be used to recover any of those data packets that may be lost.

In one embodiment, the size of each data packet is included in a header for a corresponding data packet that needs to be read for purposes of FEC creation. In another embodiment, rather than communicating the size of each data packet in a header for a corresponding data packet that needs to be read for purposes of FEC creation, because each of packets 810*a* and 811*a* for the encoded slices is stored, the sizing of each of these packets is known or can be determined. Once the size of the largest packet is known in the set of data packets that can be corrected using a corresponding FEC packet, block sizing of the packet for FEC-0 may be tuned to the largest of packets 810*a* and 811*a* when generating FEC-0.

In addition, once the size of FEC-0 is known, the padding size is also known for data packets in the set of data packets that can be corrected using FEC-0 for purposes of FEC creation and data recovery. As is shown in FIG. 8A, FEC-0 is tuned to the sizing of packet 811*a* of encoded slice 1, which is the largest packet in the set containing encoded slice 0 and encoded slice 1. As such, padding 810*b* for encoded slice 0 is required for FEC creation and/or data recovery. Because the size of the FEC-0 packet 820 is tuned to the size of packet 811*a* of encoded slice 1 (i.e., being the largest packet in the set of data packets that can be corrected using FEC-0), packet 811*a* of encoded slice 1 does not require any padding for FEC creation and/or data recovery.

In another embodiment, padding may be set to the MTU in one embodiment. Specifically, a FEC packet is normalized to the size of the MTU. Also, each of the packets in the set of packets that can be corrected using a corresponding FEC is also padded to the MTU for purposes of FEC creation and/or data recovery. For example, FEC-0 would be sized to the MTU, encoded slice 0 would be padded to the MTU, and encoded slice 1 would also be padded to the MTU, for purposes of FEC creation and/or data recovery.

Continuing with the example of FIG. 8A, FEC-1 may be used for correcting a set of data packets including encoded slice 2 and encoded slice 3. In particular, packet 812*a* is created for encoded slice 2 during compression, wherein encoded slice 2 may be sized to be compressed into one packet. Encoded slice 2 does not include a corresponding padded portion for FEC creation and/or data recovery, as it is the largest packet in the set of packets that can be recovered using FEC-1. Also, packet 813*a* is created for encoded slice 3 during compression, wherein encoded slice 3 may be sized to be compressed into one packet. Encoded slice 3 may include a corresponding padded portion 813*b* for FEC creation and data recovery that is stripped prior to transmission. FEC-1 is generated as packet 825 and is transmitted after encoded slice 2 and encoded slice 3. FEC-1 can be used to correct for each of those encoded slices that may be lost, and/or may be used to correct for lost packets of each of those compressed encoded slices. Specifically, packet 812*a* for encoded slice 1 may be transmitted as soon as it is compressed at the encoder of the server without waiting for the generation of FEC-1, and may be stored or buffered for FEC creation. Also packet 813*a* for encoded slice 3 may be transmitted as soon as it is compressed at the encoder of the server, also without waiting for the generation of FEC-1, and may be stored or buffered for FEC creation.

Similarly, the packet size of packet 825 for FEC-1 may dictate the size of the padding used for encoded slice 2 and encoded slice 3 during encoding. As previously described, the size of each data packet may be included in a header for a corresponding data packet that needs to be read for purposes of FEC creation. As previously described, rather than communicating the size of each data packet in a header for a corresponding data packet that needs to be read for purposes of FEC creation, because each of packets 812*a* and 813*a* for the encoded slices is stored, the sizing of each of these packets is known or can be determined. Once the size of the largest packet is known in the set of data packets that can be corrected using a corresponding FEC packet, block sizing of the packet for FEC-1 may be tuned to the largest of packets 812*a* and 813*a* when generating FEC-1. In particular, once the size of FEC-1 is known, then padding is known for data packets in the set of data packets that can be corrected using FEC-1 for purposes of FEC creation and data recovery. As is shown in FIG. 8A, FEC-1 is tuned to the sizing of packet 812*a* of encoded slice 2, which is the largest packet in the set containing encoded slice 2 and encoded slice 3. As such, no padding is required for encoded slice 2 for FEC creation and/or data recovery. On the other hand, padding 813*b* for encoded slice 3 is required for FEC creation and/or data recovery.

One or more strategies may be implemented to recover encoded slices and/or packets of encoded slices at the client that are lost during transmission from the server to the client when streaming media content and/or receiving streamed media content, in embodiments of the present disclosure. As previously described, each encoded slice of a corresponding compressed video frame is packetized into one corresponding network packet, such that a packet corresponds to single encoded slice in a one-to-one relationship. When overlapping all parts of the pipeline including both server and client operations, a determination needs to be made when to wait for additional packets of a corresponding video frame (e.g., when lost packets have not been received) and when to move on to the next video frame.

Figure 8B:
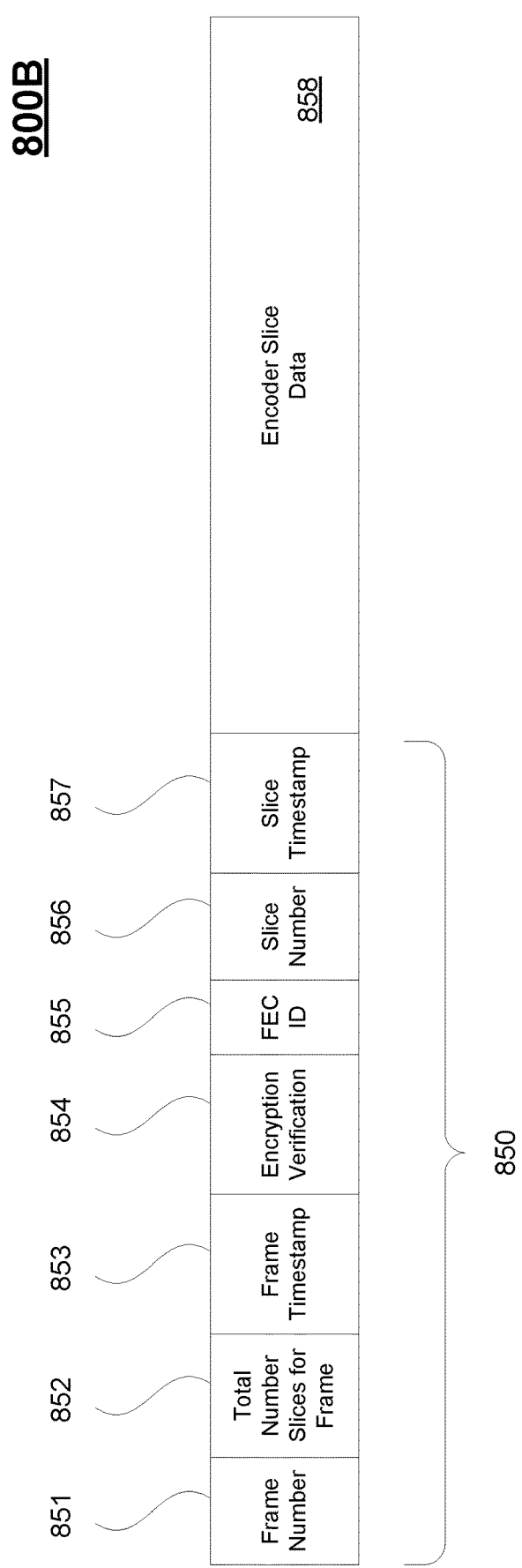
FIG. 8B is a diagram of a header of a packet of an encoded slice, in accordance with one embodiment of the disclosure.

Information in a header of a data packet may be used to make the determination when to move to the next video frame. In each data packet header, a frame index exists that tells the video game (e.g., gaming application) to which video frame a corresponding packet belongs. Additionally, each packet header contains information about the packet index and the total number of packets for that frame. For example, FIG. 8B is a diagram of a header 850 of a data packet 800B of an encoded slice for a corresponding video frame, in accordance with one embodiment of the disclosure. For example, information in header 850 includes: a frame number 851 for the corresponding video frame, total number of encoded slices for the corresponding video frame 852, a frame generation timestamp (e.g., taken at flip-time) 853, encryption verification 854, an identifier for the corresponding FEC packet 855, an encoded slice number 856, and a timestamp 857 designating when the corresponding encoded slice was generated. Optionally, a size of the data packet 800B may be included in header 850. Data packet 800B includes a data portion 858.

At the point a data packet from the next video frame is received at the client, a decision is made whether to wait for remaining data packets for the current video frame, or to move on to the next video frame. Specifically, as packets are received for the current video frame (N), tracking of which packets have been received is performed. In one embodiment, as soon as a packet from the next video frame (N+1) is received, any packets that have not been received for the current video frame (minus FEC packets) need to be corrected, such as through a method called "predec". Predec is performed to generate a syntactically correct H.264 encoded slice in order to keep the entire H.264 video frame syntactically correct. That is, when it is determined that an encoded slice and/or one or more packets of the encoded slice is lost, a filler slice is generated as a substitute for the lost encoded slice, by means of inserting skip macroblocks. In that manner, the decoder is less likely to crash when there are lost encoded slices.

At this point, corruption may occur on the client side and reference frame invalidation, FEC recovery, or using data from a previously rendered video frame may need to be performed to fix any corrupted areas (e.g., skip macroblocks corresponding to the lost encoded slice) on the screen.

For example, in one embodiment reference frame invalidation may be performed to fix the skip macroblocks for the pixels corresponding to the first encoded slice. In another embodiment, FEC recovery is performed to correct a lost encoded slice and/or lost data packet or lost packets of a corresponding encoded slice. For example, a FEC packet and/or FEC slice that is received is used to regenerate and/or recover the lost encoded slice or lost data packet or lost data packets of a corresponding encoded slice.

In still another embodiment, a previous video frame is used to fix the skip macroblocks. For example, color values from a previous video frame for pixels corresponding to the skip macroblocks of the lost encoded slice are used when rendering to the display for the current video frame at the client. In particular, appropriate data from the frame buffer holding pixel data for the previous video frame is identified as overlapping with the pixels and/or skip macroblocks for the lost encoded slice. For example, a current video frame may have eight slices, out of which the second encoded slice is missing. Since the previous video frame has already been rendered for display at the client, data from the previous video frame may be used to address the missing second encoded slice of the current video frame. For purposes of illustration, the previous video frame may have been split into thirteen encoded slices. Data for the current video frame that is rendered for display at the client is placed into a "new" display buffer (e.g., pixel by pixel). Pixel data for the previous video frame that overlaps with the pixels corresponding to the lost encoded slice may be identified and accessed from an "old" display buffer. That is, the pixel data from the previous video frame may be used for the missing second encoded slice of the current video frame.

Figure 9:
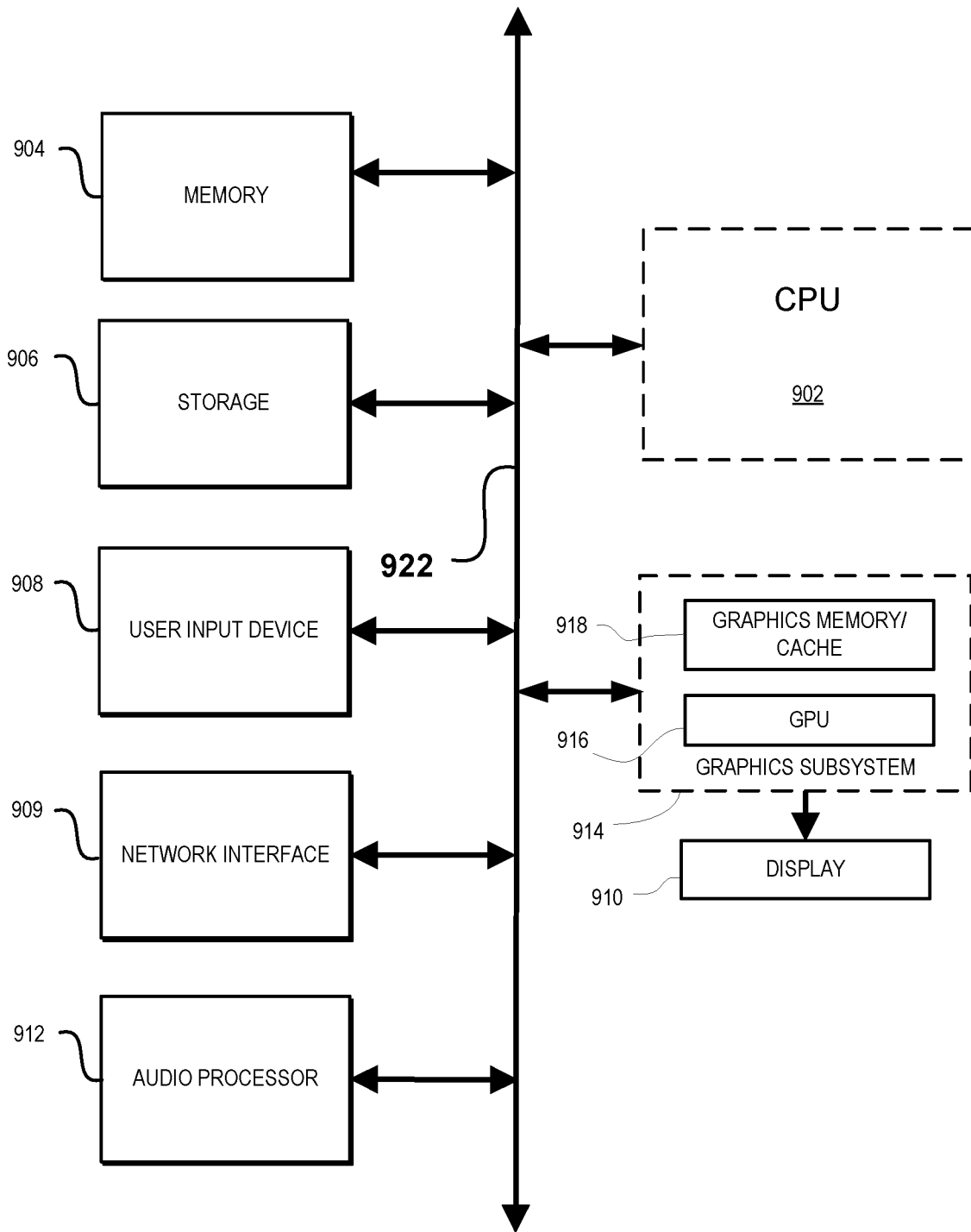
FIG. 9 illustrates components of an example device that can be used to perform aspects of the various embodiments of the present disclosure.

FIG. 9 illustrates components of an example device 900 that can be used to perform aspects of the various embodiments of the present disclosure. For example, FIG. 9 illustrates an exemplary hardware system suitable for streaming media content and/or receiving streamed media content, including overlapping encode and send operations at the server, and overlapping receive and decode operations at the client, and overlapping receive, decode, and rendering to a display operations at the client, in accordance with embodiments of the disclosure. This block diagram illustrates a device 900 that can incorporate or can be a personal computer, a server computer, gaming console, mobile device, or other digital device, each of which is suitable for practicing an embodiment of the invention. Device 900 includes a central processing unit (CPU) 902 for running software applications and optionally an operating system. CPU 902 may be comprised of one or more homogeneous or heterogeneous processing cores.

In accordance with various embodiments, CPU 902 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 904 stores applications and data for use by the CPU 902 and GPU 916. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 908 communicate user inputs from one or more users to device 900, examples of which may include keyboards, mice, joysticks, touch pads, touch screens, still or video recorders/cameras, and/or microphones. Network interface 909 allows device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of device 900, including CPU 902, graphics subsystem including GPU 916 and GPU cache 918, memory 904, data storage 906, user input devices 908, network interface 909, and audio processor 912 are connected via one or more data buses 922.

A graphics subsystem 914 is further connected with data bus 922 and the components of the device 900. The graphics subsystem 914 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 916, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 914 periodically outputs pixel data for an image from graphics memory 918 to be displayed on display device 910, or to be projected by a projection system (not shown). Display device 910 can be any device capable of displaying visual information in response to a signal from the device 900, including CRT, LCD, plasma, and OLED displays. Device 900 can provide the display device 910 with an analog or digital signal, for example.

Other embodiments for optimizing the graphics subsystem 914 could include multi-tenancy GPU operations where a GPU instance is shared between multiple applications, and distributed GPUs supporting a single game. The graphics subsystem 914 could be configured as one or more processing devices.

For example, the graphics subsystem 914 may be configured to perform multi-tenancy GPU functionality, wherein one graphics subsystem could be implementing graphics and/or rendering pipelines for multiple games, in one embodiment. That is, the graphics subsystem 914 is shared between multiple games that are being executed.

In other embodiments, the graphics subsystem 914 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for streaming media content and/or receiving streamed media content, including overlapping encode and send operations at the server, and overlapping receive and decode operations at the client, and overlapping receive, decode, and rendering to a display operations at the client.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for cloud gaming, comprising:
generating a video frame at a server;
scanning-in the video frame to an encoder before a first next occurrence of a server VSYNC signal;
encoding the video frame to generate a plurality of encoded slices, wherein the encoding of the video frame begins before the scanning-in of the video frame to the encoder has fully completed;
storing the plurality of encoded slices in a buffer; and
streaming the plurality of encoded slices from the buffer to a client device before a second next occurrence of the server VSYNC signal, wherein the streaming of the plurality of encoded slices begins before the scanning-in of the video frame to the encoder has fully completed.

2. The method of claim 1, further comprising:
beginning the streaming of the plurality of encoded slices before the encoding of the video frame has fully completed.

3. The method of claim 1,
wherein the scanning-in of the video frame occurs at a flip time.

4. The method of claim 1, wherein the encoding the video frame includes:
encoding a plurality of encoder slices of the video frame as the plurality of encoded slices; and
delivering the plurality of encoded slices to the buffer at an encoder fill rate.

5. The method of claim 4, further comprising:
draining an encoded slice from the buffer at a buffer drain rate; and
streaming the encoded slice over a network to the client device,
wherein the encoded slice is streamed to the client device before the scanning-in of the video frame to the encoder has fully completed.

6. The method of claim 1, further comprising:
modifying the video frame during the scanning-in of the video frame, such that the video frame that is scanned-in to the encoder has been modified.

7. The method of claim 1,
wherein the first next occurrence and the second next occurrence of the server VSYNC signal occur at the same time.

8. A non-transitory computer-readable medium storing a computer program performing a method for cloud gaming, the computer-readable medium comprising:
program instructions for generating a video frame at a server;
program instructions for scanning-in the video frame to an encoder before a first next occurrence of a server VSYNC signal;
program instructions for encoding the video frame to generate a plurality of encoded slices, wherein the encoding of the video frame begins before the scanning-in of the video frame to the encoder has fully completed;
program instructions for storing the plurality of encoded slices in a buffer; and
program instructions for streaming the plurality of encoded slices from the buffer to a client device before a second next occurrence of the server VSYNC signal, wherein the streaming of the plurality of encoded slices begins before the scanning-in of the video frame to the encoder has fully completed.

9. The non-transitory computer-readable medium of claim 8, further comprising:
    program instructions for beginning the streaming of the plurality of encoded slices before the encoding of the video frame has fully completed.

10. The non-transitory computer-readable medium of claim 8,
    wherein the scanning-in of the video frame occurs at a flip time.

11. The non-transitory computer-readable medium of claim 8, wherein the program instructions for encoding the video frame includes:
    program instructions for encoding a plurality of encoder slices of the video frame as the plurality of encoded slices; and
    program instructions for delivering the plurality of encoded slices to the buffer at an encoder fill rate.

12. The non-transitory computer-readable medium of claim 11, further comprising:
    program instructions for draining an encoded slice from the buffer at a buffer drain rate; and
    program instructions for streaming the encoded slice over a network to the client device,
    wherein the encoded slice is streamed to the client device before the scanning-in of the video frame to the encoder has fully completed.

13. The non-transitory computer-readable medium of claim 8, further comprising:
    program instructions for modifying the video frame during the scanning-in of the video frame, such that the video frame that is scanned-in to the encoder has been modified.

14. The non-transitory computer-readable medium of claim 8,
    wherein the first next occurrence and the second next occurrence of the server VSYNC signal occur at the same time.

15. A computer system comprising:
    a processor; and
    memory coupled to the processor and having stored therein instructions that, if executed by the computer system, cause the computer system to execute a method for cloud gaming comprising:
    generating a video frame at a server;
    scanning-in the video frame to an encoder before a first next occurrence of a server VSYNC signal;
    encoding the video frame to generate a plurality of encoded slices, wherein the encoding of the video frame begins before the scanning-in of the video frame to the encoder has fully completed;
    storing the plurality of encoded slices in a buffer; and
    streaming the plurality of encoded slices from the buffer to a client device before a second next occurrence of the server VSYNC signal, wherein the streaming of the plurality of encoded slices begins before the scanning-in of the video frame to the encoder has fully completed.

16. The computer system of claim 15, the method further comprising:
    beginning the streaming of the plurality of encoded slices before the encoding of the video frame has fully completed.

17. The computer system of claim 15,
    wherein in the method the scanning-in of the video frame occurs at a flip time.

18. The computer system of claim 15, wherein in the method the encoding the video frame includes:
    encoding a plurality of encoder slices of the video frame as the plurality of encoded slices; and
    delivering the plurality of encoded slices to the buffer at an encoder fill rate.

19. The computer system of claim 15, the method further comprising:
    modifying the video frame during the scanning-in of the video frame, such that the video frame that is scanned-in to the encoder has been modified.

20. The computer system of claim 15,
    wherein in the method the first next occurrence and the second next occurrence of the server VSYNC signal occur at the same time.

* * * * *